(12) United States Patent
Zauderer

(10) Patent No.: US 8,337,613 B2
(45) Date of Patent: Dec. 25, 2012

(54) SLAGGING COAL COMBUSTOR FOR CEMENTITIOUS SLAG PRODUCTION, METAL OXIDE REDUCTION, SHALE GAS AND OIL RECOVERY, ENVIROMENTAL REMEDIATION, EMISSION CONTROL AND $CO_2$ SEQUESTRATION

(76) Inventor: Bert Zauderer, Merion Station, PA (US)

( * ) Notice: Subject to any disclaimer, the term of this patent is extended or adjusted under 35 U.S.C. 154(b) by 0 days.

(21) Appl. No.: 12/985,706

(22) Filed: Jan. 6, 2011

(65) Prior Publication Data

US 2011/0173139 A1     Jul. 14, 2011

Related U.S. Application Data

(60) Provisional application No. 61/293,841, filed on Jan. 11, 2010.

(51) Int. Cl.
*C04B 7/14* (2006.01)

(52) U.S. Cl. ........ 106/789; 106/705; 106/738; 106/761; 423/220; 705/37; 705/308; 705/500

(58) Field of Classification Search ................. 106/705, 106/DIG. 1, 789, 745, 738, 761; 423/220; 705/37.308, 500
See application file for complete search history.

(56) References Cited

U.S. PATENT DOCUMENTS

| | | | | |
|---|---|---|---|---|
| 4,022,630 | A * | 5/1977 | Watson et al. | 106/745 |
| 4,508,573 | A * | 4/1985 | Harris | 106/752 |
| 4,624,191 | A | 11/1986 | Zauderer | |
| 4,765,258 | A | 8/1988 | Zauderer | |
| 5,172,644 | A * | 12/1992 | Offen | 110/345 |
| 5,216,884 | A * | 6/1993 | Holsiepe | 60/648 |
| 6,029,588 | A * | 2/2000 | Baudhuin | 110/344 |
| 6,048,510 | A | 4/2000 | Zauderer | |
| 6,216,611 | B1 * | 4/2001 | Baudhuin | 110/233 |
| 6,453,830 | B1 | 9/2002 | Zauderer | |
| 6,601,541 | B2 * | 8/2003 | Burdis et al. | 122/4 D |
| 6,701,712 | B2 * | 3/2004 | Bronicki et al. | 60/645 |
| 6,722,295 | B2 | 4/2004 | Zauderer | |
| 6,749,681 | B1 * | 6/2004 | Burdis et al. | 106/744 |
| 6,755,905 | B2 * | 6/2004 | Oates et al. | 106/705 |
| 7,047,748 | B2 | 5/2006 | Zauderer | |
| 7,247,285 | B2 | 7/2007 | Zauderer | |
| 7,261,154 | B2 * | 8/2007 | Hall et al. | 166/242.2 |
| 7,282,189 | B2 * | 10/2007 | Zauderer | 423/220 |
| 7,435,400 | B2 | 10/2008 | Zauderer | |
| 7,491,268 | B2 * | 2/2009 | Hoffis | 106/714 |
| 7,553,463 | B2 * | 6/2009 | Zauderer | 423/210 |

(Continued)

OTHER PUBLICATIONS

Jennings, "A Pilot Study: Using knowledge-based . . . Pennsylvania", 2002, URL: http://www.geo.wvu.edu/~warner/danajenningsthesis.pdf, 57 pages.

(Continued)

*Primary Examiner* — Paul Marcantoni
(74) *Attorney, Agent, or Firm* — Andrew M. Calderon; Roberts Mlotkowski Safran & Cole, P.C.

(57) ABSTRACT

Systems, methods and processes teach by specific examples how the cost of sequestering carbon dioxide ($CO_2$) can be totally offset and turned into profits during coal powered electricity generation from revenue and co-benefits. The process is provided whereby fly ash-carbon mixtures, or devolatilized coal char, or anthracite coal culm is co-fired in an air-cooled, slagging combustor with limestone or similar slag fluxing materials converts the ash into cementitious slag with properties similar to ground granulated blast furnace slag.

34 Claims, 9 Drawing Sheets

Drawing of 20 MMBtu/hr Combustor-Boiler

U.S. PATENT DOCUMENTS

| | | | |
|---|---|---|---|
| 7,906,086 B2 * | 3/2011 | Comrie | 423/210 |
| 7,966,250 B2 * | 6/2011 | Constantz et al. | 705/37 |
| 8,105,558 B2 * | 1/2012 | Comrie | 423/210 |
| 8,150,776 B2 * | 4/2012 | Comrie | 705/308 |
| 2012/0058042 A1 * | 3/2012 | Zauderer | 423/432 |

OTHER PUBLICATIONS

U.S. Department of Energy, "20% Wind Energy by 2030 . . . Electricity Supply", Dec. 2008, 27 pages.

* cited by examiner

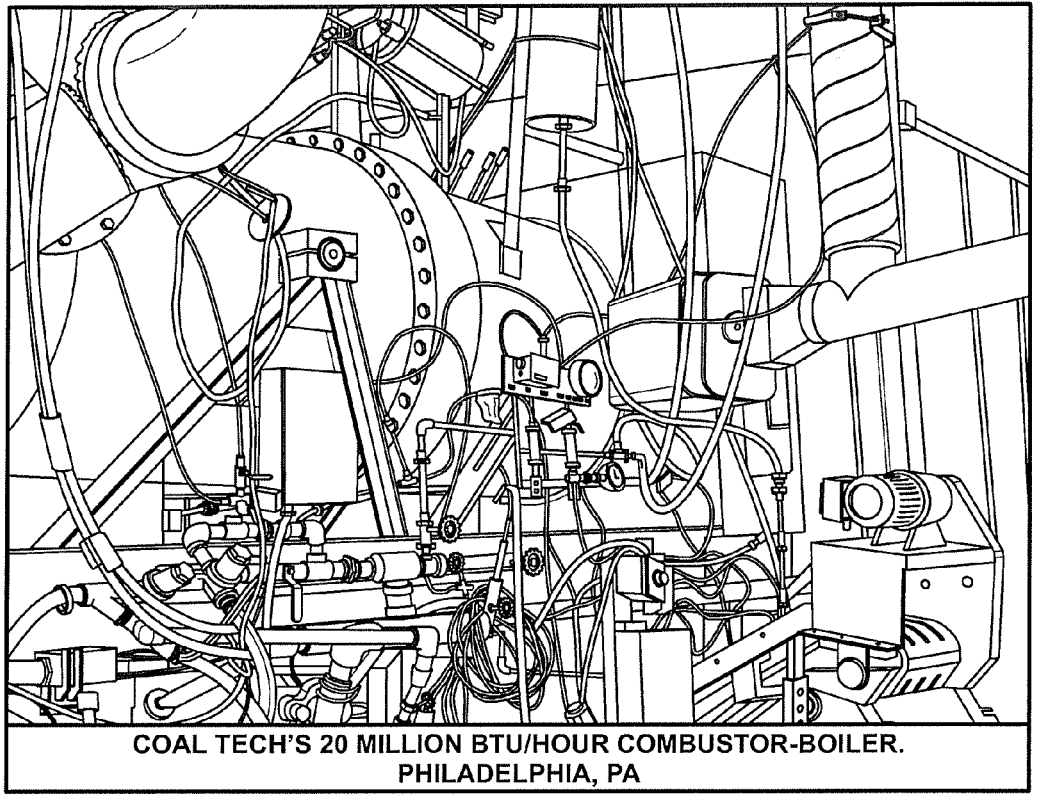
FIGURE 1: 20 MMBtu Combustor (left) attached to Boiler (right-rear)
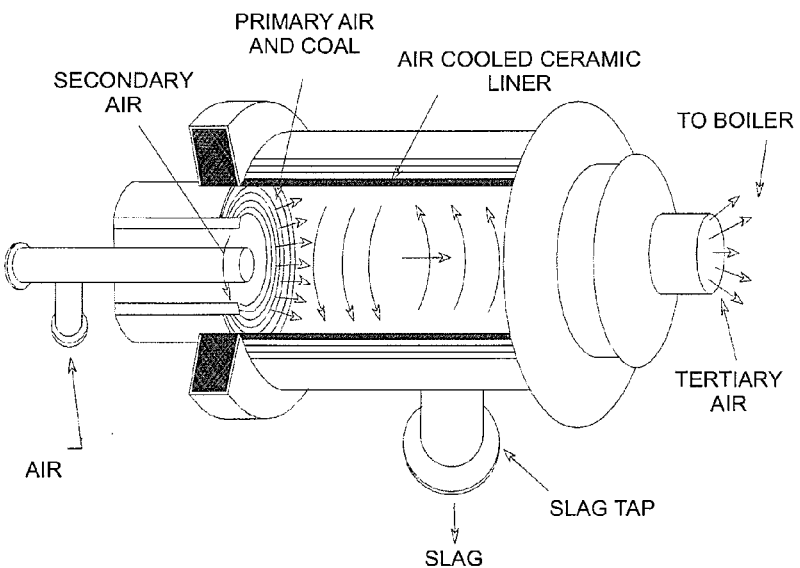
FIGURE. 2 : Drawing of 20 MM BTU/Hr COMBUSTOR

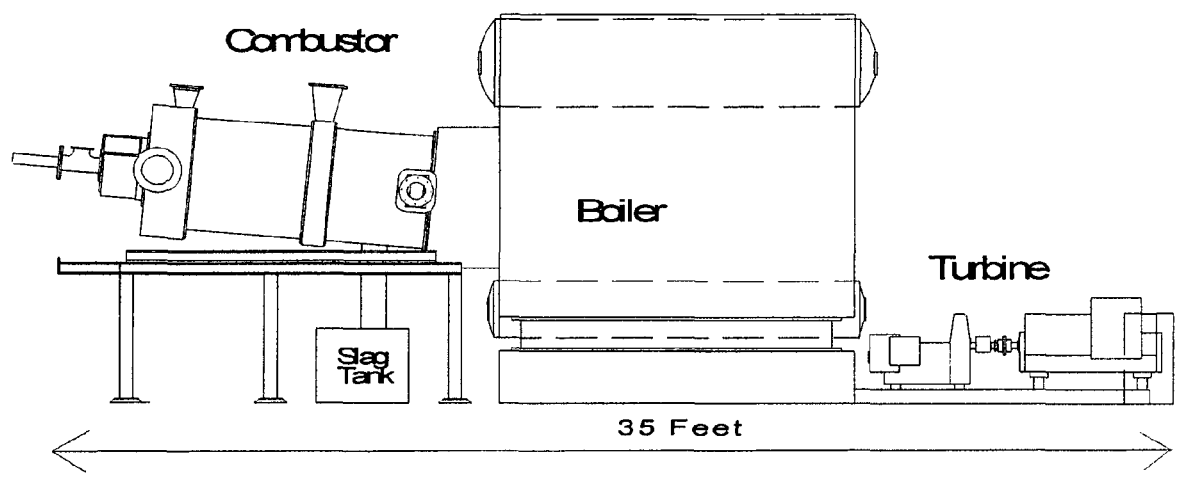
FIGURE 3: Drawing of 20 MMBtu/hr Combustor-Boiler

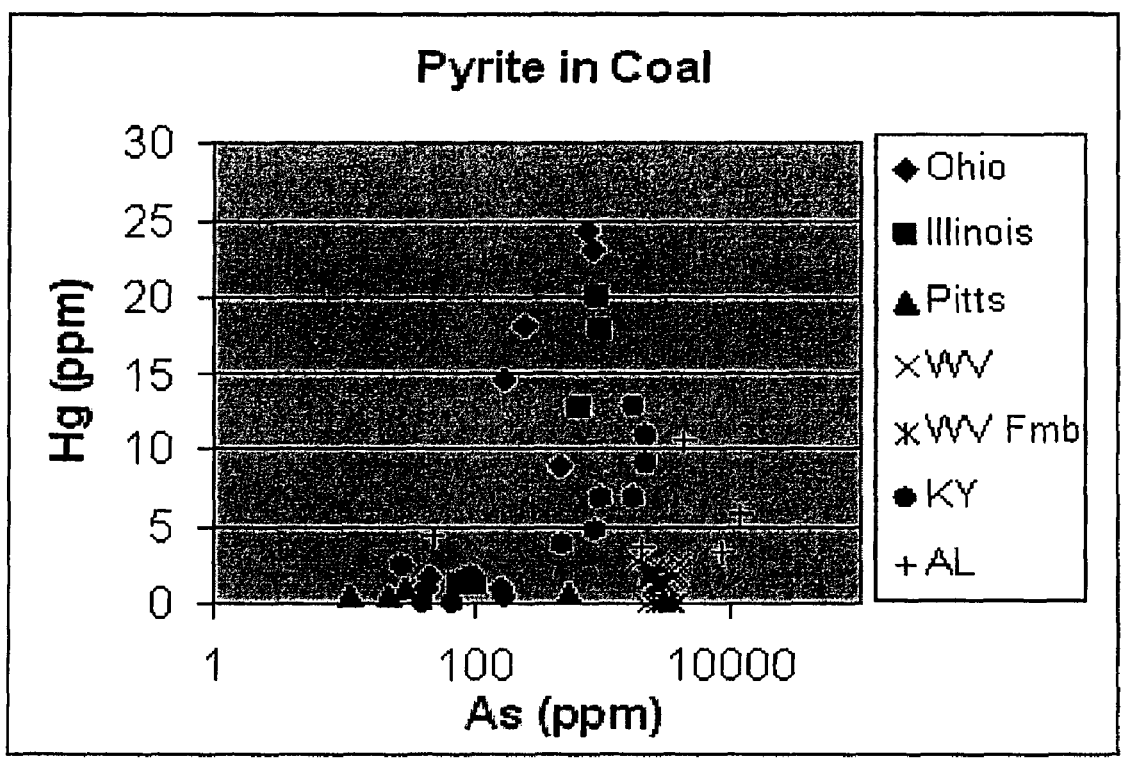
FIGURE 4: In bituminous coals, the mercury is concentrated in the ash pyrites
Source" U.S. Geologic Survey

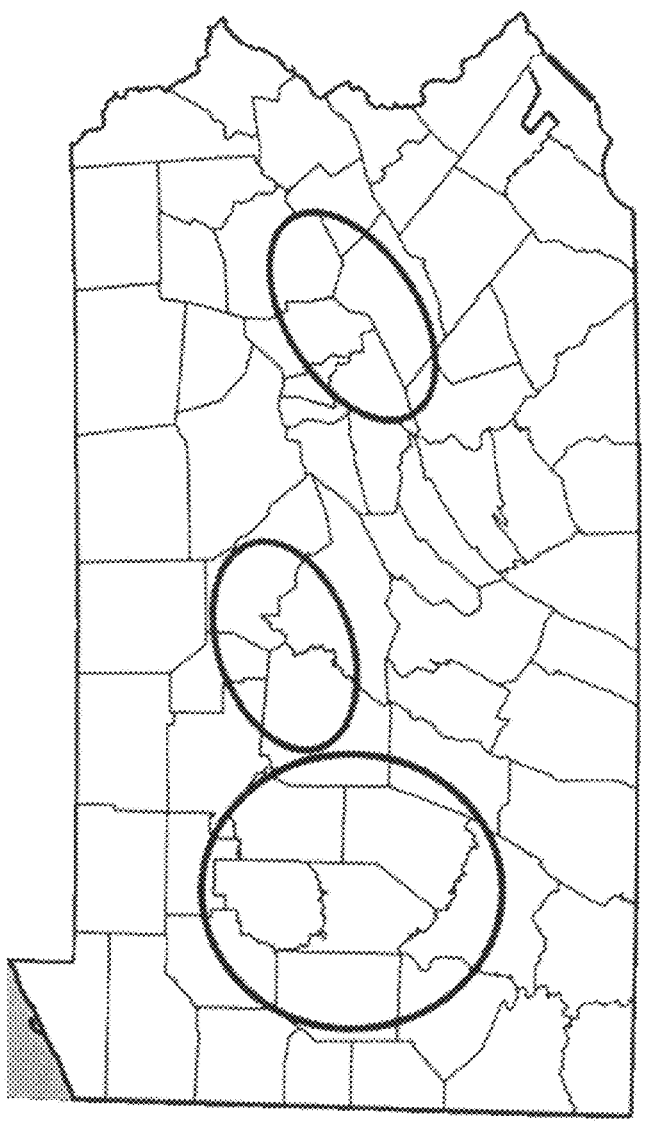

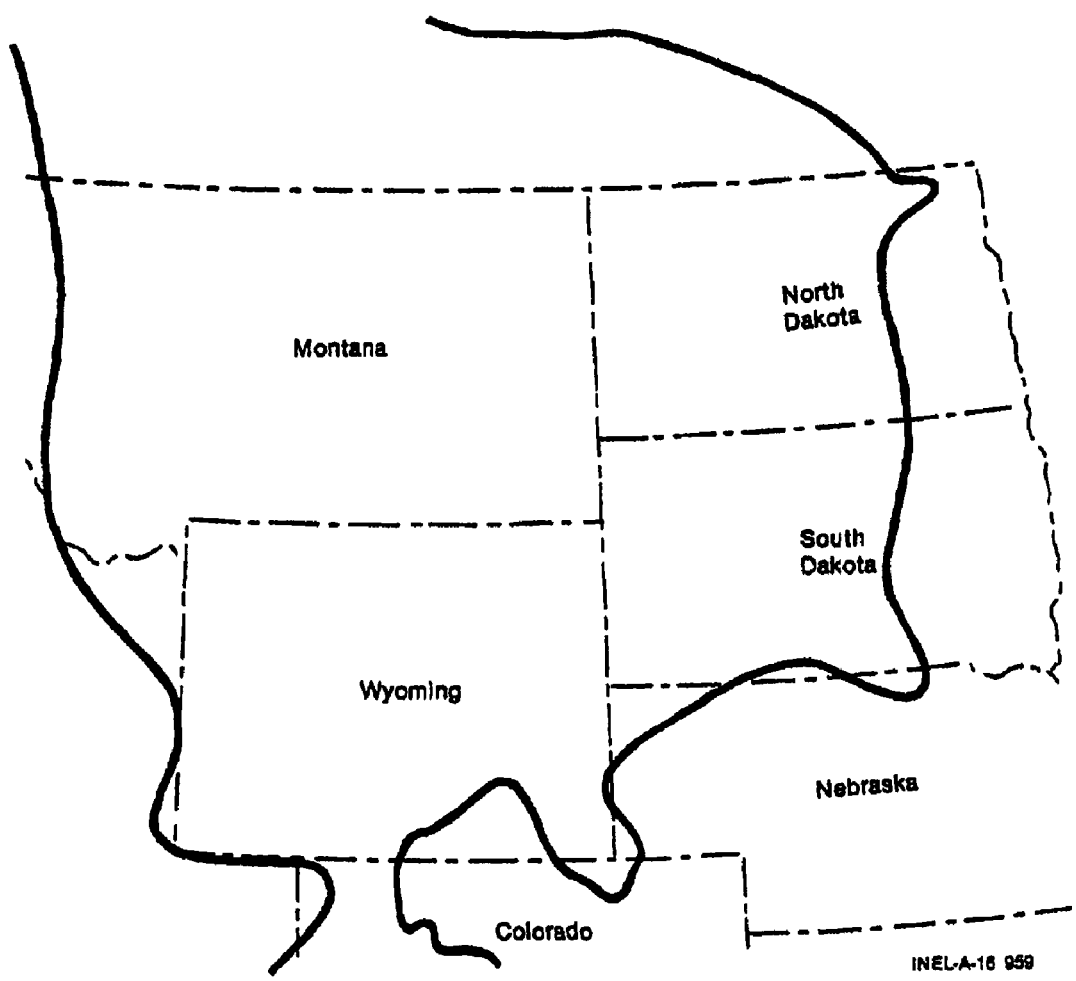
Figure 6  Areal Distribution Of Madison Group

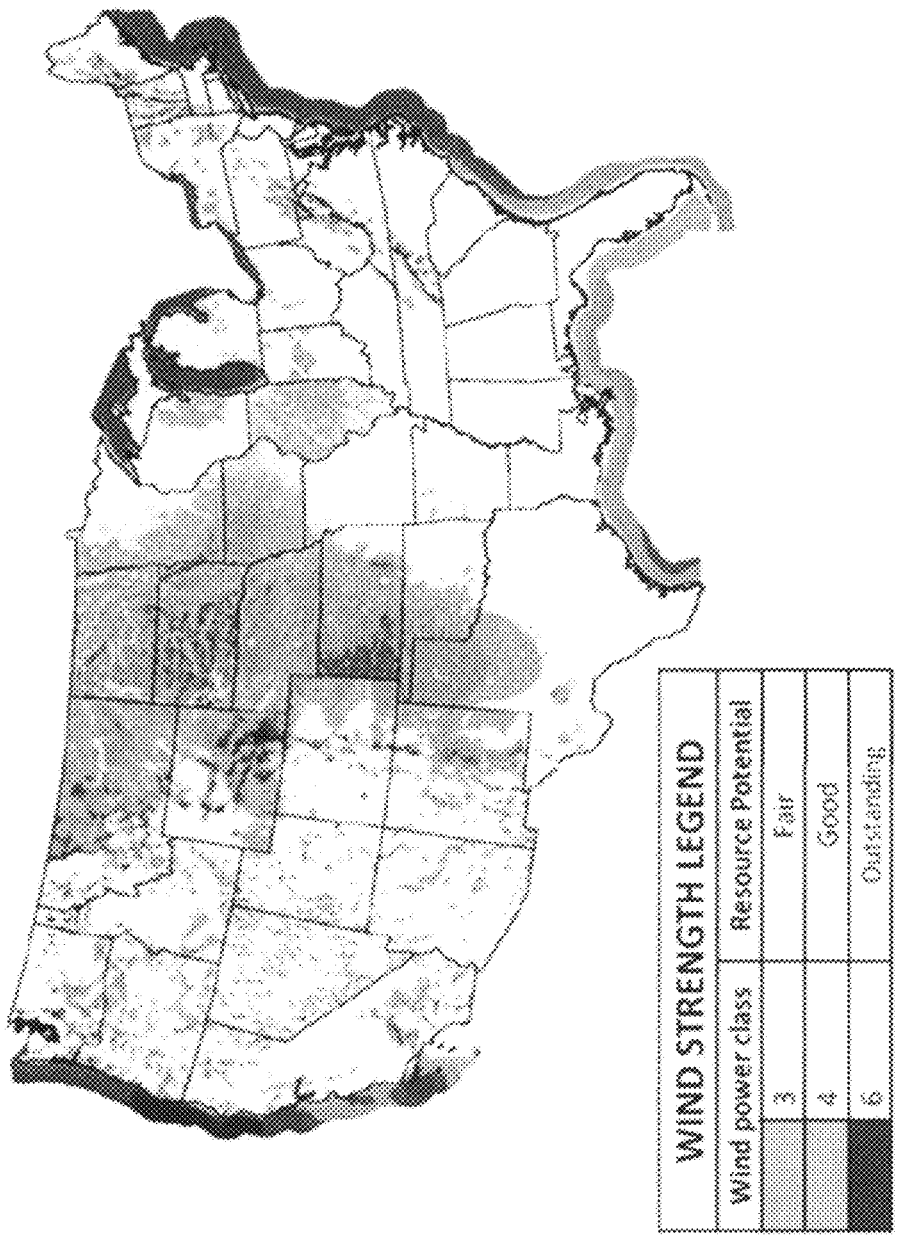

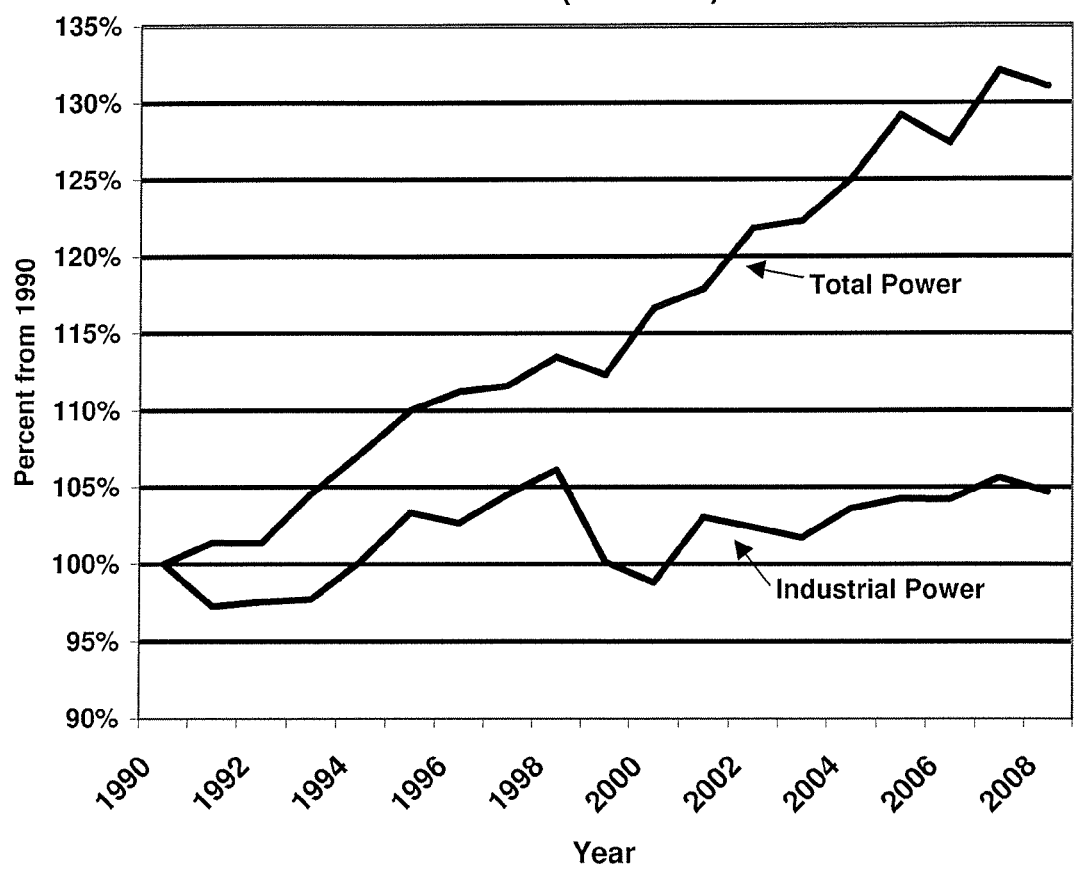

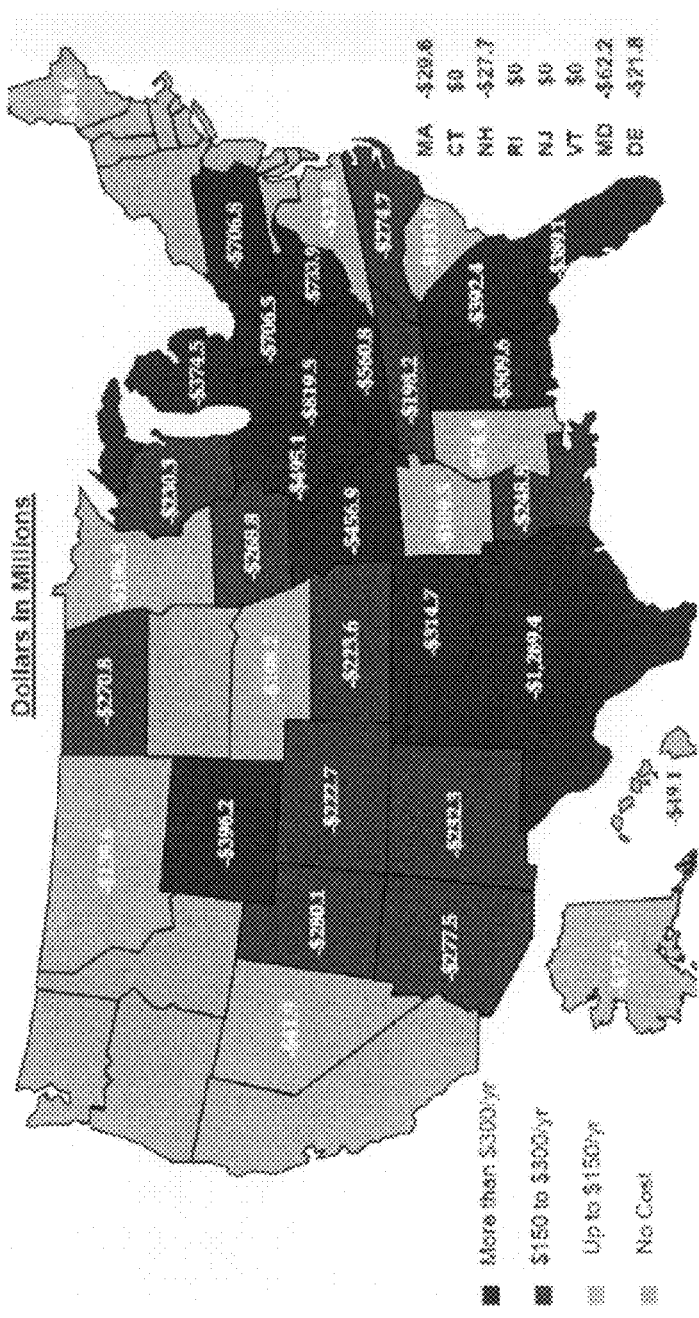

FIGURE 10: Manufacturing Employment in Pennsylvania (Source Bureau of Labor Statistics)
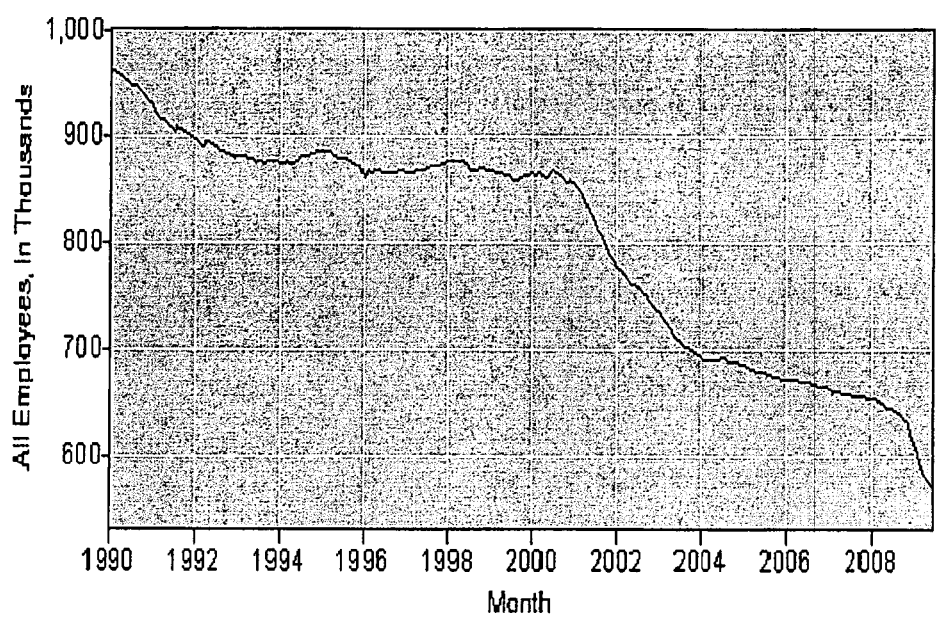

SLAGGING COAL COMBUSTOR FOR CEMENTITIOUS SLAG PRODUCTION, METAL OXIDE REDUCTION, SHALE GAS AND OIL RECOVERY, ENVIROMENTAL REMEDIATION, EMISSION CONTROL AND CO₂ SEQUESTRATION

CROSS REFERENCE TO RELATED APPLICATIONS

This application claims priority to provisional application Ser. No. 61/293,841, filed on Jan. 11, 2010, the contents of which are incorporated by reference in their entirety herein.

FIELD OF THE INVENTION

This invention teaches by specific examples how the cost of sequestering carbon dioxide ($CO_2$) can be totally offset and turned into profits during coal powered electricity generation from revenue and co-benefits. One co-benefit is production of high market value, cementitious slag during the combustion of coal char, culm, refuse derived fuel (RDF), and unburned carbon in fly ash in an air-cooled, slagging combustor-boiler system. Others are listed below. This combustion system incorporates air, water and ground emission controls that achieve near total removal of $NO_x$, $SO_2$, trace metals, dioxins/furans, and separation of $CO_2$ from the combustion gas exhaust followed by its sequestration in deep limestone geologic formations. Implementation of these combustion and emission controls are based on Bert Zauderer's U.S. Pat. No. 7,553,463, U.S. Pat. No. 7,435,400, U.S. Pat. No. 7,282,189, U.S. Pat. No. 7,247,285, U.S. Pat. No. 7,047,748, U.S. Pat. No. 6,722,295, U.S. Pat. No. 6,453,830, U.S. Pat. No. 6,048,510, U.S. Pat. No. 4,765,258, and U.S. Pat. No. 4,624,191, the contents of which are incorporated by reference in their entirety. The air-cooled slagging cyclone combustor was first disclosed in U.S. Pat. No. 4,624,191 and expanded in the other patents to include near total emission reduction at minimal capital costs. Elements of these technologies were developed and tested in various coal combustor test facilities, in coal fired utility boilers, and in a municipal waste incinerator, with internal U.S. Department of Energy (DOE), Pennsylvania (PA), and private sector support. Two important projects were: The DOE Clean Coal 1 Project [No. DE-FC22-87PC79799-(1986-1991)], and the DOE Coal Fired Combustion-Phase 3 Project [No. DE-AC22-91PC91162 (1991-1999)] during which the technologies were developed on an air-cooled slagging coal combustor attached to a 20 MMBtu/hour, oil/gas design boiler that was fired with pulverized coal alone, or in combination with gas, oil, biomass and Refuse Derived Fuel (RDF). U.S. Pat. No. 7,553,463 and U.S. Pat. No. 7,282,189 teach very low cost separation of $CO_2$ from the combustion of devolatilized coal char in the gas exhaust and permanent sequestration in underground geologic formations of limestone. Said patents also disclosed a process for converting the volatile matter in coal to hydrogen or methane and the sequestration of the $CO_2$ remaining after devolatilization with the $CO_2$ from the char combustion in preferably underground limestone formations.

In the present invention, the technical and economic advantages of the $CO_2$ removal and sequestration processes disclosed in said patents are integrated with other processes, including:

(A) Cementitious slag production from fly ash, coal culm, solid waste in slagging combustor-boiler power plants located near existing large coal power plants or sequestration sites (B) Converting municipal solid waste (MSW) into Refuse Derived Fuel (RDF) for co-firing with coal in the slagging combustor (C) Utilizing all or part of the hydrogen derived from coal devolatilization to reduce certain metal oxides into metals, for electricity production, as a transportation fuel, or in chemical processes, (D) Conversion of high ash, anthracite culm in PA to cementitious slag and electricity, (E) Using limestone in excess of that necessary to implement the combustor system emission control for neutralizing acidified waterways, and abandoned mine sites, (F) Using the combustor to convert surface coal mine overburden to cementitious slag, (G) Using $CO_2$ from combustion to recover shale gas deposits followed by sequestration (H) Convert $CO_2$ removal and sequestration costs into profit, as opposed to other $CO_2$ processes that are costly, result in only partial $CO_2$ sequestration, or as in major multi-billion dollar projects that use $CO_2$ sequestration for enhanced oil field recovery which actually sharply increases $CO_2$ when the recovered oil is burned.

DISCUSSION

Ten Patents form the Basis for the Present Invention

The following Zauderer Patents form the basis for practicing the present invention whose objective is to teach by specific examples how to maximize $CO_2$ reduction while not only reducing its cost but also producing profits by using co-benefits or "offsets", such as producing marketable cementitious slag during electricity production, and other co-benefits as listed above. The following prior art from the patents would be used.

The Air Cooled Slagging Combustor: The first basic design of this combustor is contained in U.S. Pat. No. 4,624,191, issued in 1986. Subsequent design, fabrication, and operational improvements that were made since then are described in the other nine patents. These designs were validated in part by testing on a first generation design, 20 MMBtu/hour combustor, sponsored in part in part by the U.S. DOE on Contract: DE-FC22-87PC79799 between 1986-1991 and in a second generation combustor design on Contract: DE-AC22-91162 between 1991-1999, and reported on March 2004. The latter combustor-boiler is shown in FIGS. 1, 2, and 3.

For $CO_2$ removal and sequestration, the following prior art operations are critical:

a) $NO_x$ reduction: Over 90% $NO_x$ reduction from an uncontrolled 1 lb/MMBtu to less than 0.1 lb/MMBtu were demonstrated by fuel rich combustion in this combustor, followed by further $NO_x$ reductions in the combustor's gas exhaust by means of Selective Non-Catalytic Reduction (SNCR) with urea or ammonia, and with or without reburn firing of the post-combustion gases inside the boiler with either pulverized coal, natural gas, or biomass as the reburn fuel. Both the SNCR and Reburn $NO_x$ processes were implemented in a nominal 2000° F. post-combustion zone in the boiler furnace, as disclosed in U.S. Pat. No. 7,553,463, U.S. Pat. No. 7,435,400, U.S. Pat. No. 7,247,285, U.S. Pat. No. 6,722,295, U.S. Pat. No. 6,453,830, U.S. Pat. No. 6,048,510, U.S. Pat. No. 4,765,258, and U.S. Pat. No. 4,624,191. The capital costs for $NO_x$ reduction to less than 0.1 lb/MMBtu are in the range of a few $/kW and can be implemented on almost any boiler. As disclosed in the first two patents in this list, this SNCR process can duplicate the performance of Selective Catalytic Reduction (SCR) systems whose capital costs are well in excess of $100/kW compared with under $10/kW with the present SNCR and Reburn processes.

b) $SO_2$ reduction: $SO_2$ reduction is achieved by injection of limestone into the combustor followed by co-injection of calcium hydroxide mixed with the urea or ammonia used in the SNCR $NO_x$ process. Most of the above-cited $NO_x$ patents make provision for $SO_2$ reduction. The most recent U.S. Pat. No. 7,553,463 discloses means for achieving $SO_2$ reductions that can duplicate the near zero emissions achievable with post-combustion Flue Gas Desulfurization (FGD) to less than 0.1 lb/MMBtu). FGD capital costs are in the $400/kW range, which is so costly that it has been installed almost exclusively on large (over 300 MW) coal power boilers. In sharp contrast, the capital costs for $SO_2$ reduction with Zauderer's patents are in the same several $/kW range as the $NO_x$ processes, a cost that is further reduced by the use of the same components as the SNCR $NO_x$ process. One novel feature is that part of the $SO_2$ reduction process takes place inside the air-cooled combustor where $CaSO_4$ particles are formed by reaction of CaO with $SO_2$, and the particles impact and dissolve in the liquid slag layer that lines the inside of the combustor. The slag is drained through a slag tap and quenched in a water tank to form cementitious slag, with the sulfur compound trapped in the chemically inert slag.

c) Removal of Trace Metals in Coal Ash: A feature needed for safe permanent $CO_2$ sequestration, especially for sequestration in underground saline formations, is trapping the volatile trace metals in coal ash in the slag lining the inside walls of the air cooled combustor and removing the slag within 3 minutes to prevent re-evolution of these metals into the combustion gases, as detailed in U.S. Pat. No. 7,247,285. The metals include arsenic (As), barium (Ba), cadmium (Cd), lead (Pb), mercury (Hg), selenium (Se), and zinc (Zn) that are released during coal combustion. An extremely important result disclosed in U.S. Pat. No. 7,553,463 is that in Bituminous coals most of the mercury is concentrated in the mineral matter, namely the ash, and its concentration is related to the arsenic concentration in the ash (FIG. 4). Therefore, it can be retained in the slag, and does not require the use of activated carbon injection in the combustion gas exhaust, as is the case in sub-bituminous and lignite coals, which account for the other one-half of U.S. coal use. The slag layer flow rate on the combustor walls is controlled with limestone injection, which lowers the slag viscosity, and assures rapid liquid slag drainage without volatile metal re-evolution. $SO_2$ that reacts with calcined limestone inside the combustor is also trapped in the slag and removed by water quenching. This quenched slag has similar cementitious properties as Ground Granulated Blast Furnace Slag (GGBFS), whose mechanical strength is greater than Portland cement, and therefore its market value is almost double that of Portland cement. The high market value of this slag is the major factor in making this combustor so economically attractive for the $CO_2$ sequestration and offsets.

d) Dioxins and Furans. U.S. Pat. No. 7,247,285 disclosed methods to eliminate dioxins and furans, which are highly toxic trace compounds that are generally released during incineration of Municipal Solid Waste (MSW), and to a much lesser extent in combustion of fossil fuels, mainly coal. This patent disclosed that dioxins and furans can be controlled in the air-cooled slagging combustor and in the post combustion region of boilers and furnaces. To use MSW in the combustors it must first be processed into Refuse Derived Fuel (RDF), which looks like fuzz collected in vacuuming a carpet, by removing the inert matter in MSW. RDF also contains plastic chips in the mm size range. In tests conducted by the present inventor in the 20 MMBtu/hr air-cooled combustor it was observed that co-firing of RDF with 80% to 90% pulverized coal produced the best combustion results because the RDF dispersion in the combustor is not completely uniform.

On the other hand, MSW furnaces use mass burning on a traveling grate, which results in non-uniform combustion. An article in a Power magazine, dated December 2009, described the operating problems in one municipal incinerator where by coincidence this inventor performed a one-day dioxin and furan test in 2001 that are described in U.S. Pat. No. 7,247, 285. While all power plants must report $CO_2$ emissions to EPA, which EPA posts in their web site, MSW boilers are not there. The Power magazine article states that there are 87 Waste to Energy (WTE) plants in 25 States. They burn 30 million tons of municipal solid waste (MSW) per year and generate 17 million MWH of electricity per year. (The 17 million kWh in the article is in error). According to EPA that tonnage is about 15% of the total waste generated. 55% of MSW goes to landfills, where some of the organic matter is converted to methane by microbes. Methane ($CH_4$) is a very much more powerful greenhouse gas than $CO_2$. According to the Energy Information Administration (EIA) of DOE one ton of $CH_4$ has a greenhouse gas effect equal to 23 tons of $CO_2$. In 2005 the gross emissions from U.S. landfills mostly from methane gas was 185 million metric tons (MMT) of $CO_2$ equivalent, which is produced by only 11.3 MMT of emissions of methane ($CH_4$). This is a critical factor in MSW disposal options because eliminating burning the MSW only shifts the climate emission problem from incineration to landfills, where the methane must be either extracted for power generation or flared to convert the $CH_4$ to 23 times lower emitting $CO_2$.

The Present Invention Offers a Solution that Eliminates Both Problems

According to EPA the Higher Heating Value (HHV) of mixed MSW is 4.800 Btu/lb, which is about 50% carbon. Therefore, the 30 million tons of MSW contains about 15 million tons of carbon, which when burned results in 55 million tons of $CO_2$ (i.e. 44/12 molecular weight ratio). Divided by the 17 million MWH results in about 3.24 tons of $CO_2$ per MWH. DOE/EIA also collects electric power production data, and in 2007 MSW capacity was 3,538 MW (EPA cited 2,116 MW for 2005). ETA's 2007 generation from MSW was 14.462 million MWH from waste to energy (WTE) furnaces. Dividing the MWH by the MW results in 4,090 hrs annual operation at full load. This equals to only a 47% annual capacity factor, a very poor number considering that coal power plants operate from 60s % to 80% annual capacity factors. Dividing 55 million tons of $CO_2$ by 14.462 million MWH output yields about 3.8 tons of $CO_2$ per MWH. This is almost 4 times the $CO_2$ emission of coal plants and 8 times those of natural gas power plants. The 55 million tons from municipal incinerators contrasts with coal power plants that operate at 80% capacity factors They would generate 55 million MWH of electricity annually (which is 3.8 times that of WTE plants) and emit the same $CO_2$ tonnage, but with only 7,800 MW capacity. Alternatively, coal power plants would generate 14.462 million MWH annually at 80% annual capacity but from only 2,063 MW of capacity and emit 26% (14.5 million tons) of $CO_2$ compared to the 55 million tons emitted by MSW plants.

The economics are also overwhelmingly in favor of coal. Rebuilding the MSW plant mentioned in the Power magazine article was priced at $80 million for 24 MW capacity, or $3,300 per kW, versus about $2,000/kW for a conventional coal plant equipped with SCR, FDG, and mercury emission controls but no $CO_2$ control, and about $3,000/kW for a super-critical steam cycle with $CO_2$ control. The second figure applies only to large 1,000 MW or greater coal plants. According to a March 2009 MIT Report, coal plants rated at below 300 MW are too small to justify the super-critical technology.

Almost all the 174 MSW plants listed by EPA are in the 10 to 20 MW range. Furthermore, municipal waste is a very low-density material that is collected from households weekly from a few 30-gallon cans. It is very costly to ship more than a few tens of miles to an incinerator. For example, a township in Pennsylvania with about 60,000 inhabitants collects about 16,000 tons of mixed waste annually for which it pays $63/ton to a WTE plant with two boilers rated at 28 MW of electricity. As noted above, the HHV of the MSW is on average 4,800 Btu/lb or 9.6 MMBtu/ton, for a total of 153,600 MMBtu annually. The plant efficiency is only 17,300 Btu/kWh, or 17.3 MMBtu/MWH, which yields 8,879 MWH annually. Applying the 4,070 average hours of U.S. MSW facility operation, results for this WTE plant rated at 28 MW in an 113,960 MWH annual potential output. So this township uses only 7.8% of the WTE plant capacity. To use it all requires a population of 640,000. The County population in 2008 was 778,000, equal to 6.25% of Pennsylvania's population. Other townships also use this WTE plant. However, this WTE plant efficiency and use compares very poorly with an average of 10,000 Btu/kWh for coal power plants in the 50 MW to several 100s MW range that operate between the 60% to 80% capacity range annually. Pennsylvania is in the PJM grid and EIA posts the daily wholesale electricity price to this grid. Over the past 9 years the average price has been $57/MWH, with a range from $36/MWH in 2002 increasing to $83/MWH in 2008. So the township's 8,879 MWH yielded only a 9-year average annual revenue from electricity sales of $506,103 to the WTE owner, while the township paid $1,008,000. While power plants must report details of power production from hourly to annually that does not seem to apply to WTE plants, although it does appear that they report to EPA.

Now with EPA's Dec. 9, 2009 decision to consider $CO_2$ and $CH_4$ air pollutants, the huge $CO_2$ emissions from WTE could probably shut them down if cap-and-trade are legislated or limited by EPA or Congress. In the former case, a number of $20 per $CO_2$ ton has been suggested, while a cost of $74 per ton of $CO_2$ was reported in the March 2009 MIT Report for new plants with $CO_2$ removal. So 3.8 tons of $CO_2$ per MWH would cost the Township's 8,879 MWH that emit 33,740 tons of $CO_2$ from $177,580 at $20/ton of $CO_2$ to $657,046 at $74 per ton of $CO_2$. If this cost cannot be passed on to the County MSW suppliers, the WTE plant would incur an added cost to the plant's presumed average 113,960 MWH an annual $CO_2$ emission of 433,048 tons. At $20 to $74 per ton, the cost would be from $8,660,960 to $32,045,552, respectively. With PJM average grid prices of $57 per MWH in this decade, the revenue of only $6,495,720 would not cover even the low $CO_2$ cost. The WTE is unlikely to recover the $CO_2$ cost from the municipalities because even at $20 per ton for $CO_2$, they would have to pay the WTE plant an extra $42 per ton, for a total $105 per ton. Their alternative in Pennsylvania is landfills whose cost is $53 per ton. Even if the cost of $CH_4$ emissions were added, which according to EIA is 0.83 ton of $CO_2$ equivalent methane, it would add $16.64 per ton of MSW, for a total of $69.64 per ton of MSW to the landfill. This cost is not out of reason, despite the fact that $CH_4$ is a 23 times stronger greenhouse gas. Of course other constraints may enter into these calculations, such as hazardous trace metals leaching into groundwater.

The next section discusses integration of RDF combustion with the $CO_2$ removal in the slagging combustor system. It is another example of co-benefits that reduces the cost of $CO_2$ removal and sequestration.

Co-firing RDF with Coal/Coal Waste with Cementitious Slag Production and $CO_2$ Removal However, the solutions disclosed in Zauderer's U.S. Pat. No. 7,247,285, and herein in this invention, eliminate the need for either $CO_2$ cap- and trade, or sequestration. It is disclosed herein to process the MSW into Refuse Derived Fuel (RDF) and co-fire it with coal or coal char in a power plant equipped with air-cooled slagging combustor and all the associated emission controls, including $CO_2$ removal and sequestration. The following gives an example how the 20 MW prototype discussed below would be used for the above Pennsylvania County's MSW.

The first step is to remove the fuel part of the MSW from non-combustible material. Based on HHV of RDF and MSW, the RDF would be about one-half of MSW by weight. The balance can be all or partly recycled or land filled. Since the combustibles have been removed there is no risk of methane emissions at the landfill. The properties of RDF provide a number of choices on its use based on the $CO_2$ removal options in U.S. Pat. No. 7,282,189.

a) All the RDF can be co-fired up to about 20% by weight, with an unburned carbon-fly ash mixture, or with anthracite culm, or regular coal.

b) The RDF is volatilized by the same method as the volatile matter in the coal is volatilized and the fixed carbon and ash residue are co-fired, again preferably with RDF residue content of 20% or less, with the coal waste as under Item (a). The volatile matter is converted to hydrogen as per said patent.

The 20% value is selected in order to take advantage of the production of cementitious slag and also from operating experience in achieving uniform combustion due to the fuzz nature of RDF.

There is one other additional option, namely co-firing with shredded mixed paper waste. At present waste newspaper brings in only about $20 per ton to this township. In either case, the paper has a HHV of 6,800 Btu/lb, ranging from magazines at 5,250 Btu/lb to newspapers at 7,950 Btu/lb. Said PA township now sells this paper for $20/ton, down from over $100 per ton a decade ago. Now since paper comes from renewable trees it has value as a fuel and as a net-zero $CO_2$ emitter. The latter alone will be worth $20 per ton under capand trade, and its fuel value of 13.6 MMBtu/ton should be worth more than natural gas, so using a low value of $4 per MMBtu, yields $54.4 per ton. So the 4,200 tons collected annually by the township would be worth $228,480 as fuel and $84,000 as non-$CO_2$ emitter (with $CO_2$ @ $20/ton), for a total $312,480. So the paper would reduce the payment to the WTE incinerator by 31% even without proceeding with the RDF production.

To quantify the implementation of RDF, one begins with the properties of RDF using results from tests conducted by the inventor's company Coal Tech Corp in 1990-1991. An Italian Company, the sponsor of the tests, prepared the RDF. The RDF varied from one month to the next. Its Proximate Analysis was: Volatile Matter, (VM) was 72.6% to 77.1%, Fixed Carbon (FC) 10.5% to 11.3%, ash 15% to 8.2%, and moisture 3% to 3.4%.

The Ultimate Analysis was: Carbon—48.7 to 57.4%, Hydrogen—7.4 to 8.8%, Oxygen—24.75 to 20.13%. The balance of $N_2$, S, and Cl are each under 1%. The RDF's HHV=8,955 to 11,389 Btu/lb. The properties range is stated because the RDF will be a small fraction of the fuel input, and the input heat rate can be readily adjusted by feed control.

Using the 16,000 annual tons of waste produced in this PA township and using the ratio of RDF from MSW of about 50%, results in an estimated 8,000 tons of RDF, which with a HHV of 17.9 MMBtu/ton of RDF and 8000 hours of operation annually, yields 143,200 MMBtu annual heat input, or 17.9 MMBtu/hr if fired at 1 ton per hour. Now if instead of only the heat input from fixed carbon, which is 10.5% of the RDF at 28 MMBtu/ton HHV, the FC would yield 810 tons annually with a HHV of 22,680 MMBtu annually, or 2.84 MMBtu per hour. The slag producing plant would be rated at 160 MMBtu/hr and produce 1,276,136 MMBtu/year. 75% of this sum would be used for electricity generation and the other 25% would melt the fly ash and calcine the limestone to produce 159,517 tons of cementitious slag.

Therefore, if either the total RDF or the RDF were mixed with carbon-fly ash or anthracite culm, the energy contribution from all the RDF would be about 11% and that of the char-RDF would be 2% of the heat throughput in an air-cooled slagging combustor boiler plant that processes all the carbon-fly ash from a 430 MW coal fired power plant. So either all the RDF or preferably, the fixed carbon in the RDF could be readily absorbed by the nominal 20 MW slag melting air-cooled combustor plant. In fact, if only the FC would be used in the slag producing combustor, then the devolatilized gas could be used as is, or converted to hydrogen, and either fuel could be used as a fuel in the WTE incinerator.

A number of different coal or coal waste with RDF combinations can be used. In effect the RDF can be integrated into the slag production operation with little impact and cost.

In this "age of green", advocates of WTE have re-characterized MSW as "renewable" because of the food waste. However, they overlook one very important fact: Agriculture emits substantial amount of $CO_2$ from the ground when it is plowed, and from machines used in planting, fertilizing, harvesting, and shipping. Scientists have raised this point in connections with ethanol and biofuels, where recovery of the $CO_2$ emitted from plowing the ground and from agriculture can take years and decades to even centuries in the case of biofuels from rainforests, to recover the $CO_2$ from the "renewable" fuel, a fact that their proponents have ignored. Also, even with recycling, estimates are that plastics account for 41% of the waste and this is not renewable. However, the major argument against WTE plants is their extremely low efficiency and poor capacity utilization. This means that almost double the amount of this "renewable" waste must be incinerated to produce the same electricity as the "non-renewable" coal and gas. The present disclosure resolves these problems at much high thermal efficiency, and very much lower cost by integrating the WTE with other high value products (cement) and at high efficiency and most important, essentially complete emission control, including total $CO_2$ removal.

e) $CO_2$ Separation and Sequestration: The primary $CO_2$ separation and sequestration processes are disclosed in U.S. Pat. No. 7,282,189, and an alternative process is disclosed in U.S. Pat. No. 7,553,463. The primary process consist of a subset of methods that can be practiced independently of each other and that are designed to achieve incremental $CO_2$ reduction and sequestration ranging from the 10% range toward 100% removal. All utilize the slagging, air-cooled combustor's capability to burn char, which consists of the fixed solid carbon in coal and its ash. As a result, the $CO_2$ concentrations in the combustor-boiler exhaust is about 20% by volume and 29% by weight, which is about double the nominal 10% concentration in conventional coal fired boilers, and about seven times the nominal 3% concentration in the exhaust of natural gas fired power plants. The $NO_x$, $SO_2$, ash, and trace metals are removed upstream of the gas exhaust. Consequently, physical separation of $CO_2$ by solution in water to form carbonic acid and gas compression are used to separate the $CO_2$ from nitrogen prior to injection into limestone geologic formations to form calcium bi-carbonate. This process eliminates the need for the very costly and energy intensive amines or ammonia to separate the $CO_2$ from the coal combustion gas exhaust. For gas fired gas turbine power plants, with the minimal $CO_2$ concentration of about 3% by volume, the amine process is cost prohibitive. The coal ash is converted to cementitious slag in the combustor, which requires less than 2 MMBtu/ton of ash to melt it, and the balance is used to produce steam for electricity.

The cementitious slag displaces a large fraction of Portland cement, which eliminates the 0.85 tons of $CO_2$ emitted per ton of produced Portland cement. The production of this slag cement in conjunction with electricity is a major advantage of this technology. Again, this $CO_2$ process can be implemented incrementally in stand-alone plants located on or near underground limestone formations that would remove up to 20% of the $CO_2$ output from a coal power plant that supplies the ash. Transition to 100% $CO_2$ removal would occur if the coal burners in existing coal power plants were retrofitted with slagging combustors and fired solely with coal char. In either partial or total $CO_2$ reduction, the coal would first be devolatilized to remove the volatile matter and converted to hydrogen by reaction with calcined limestone. The CO, produced by calcining would be sequestered. Only about 14% of the coal energy would be required to implement the entire $CO_2$ sequestration and $H_2$ production, which is less than one-half the energy consumed in amine based $CO_2$ separation. This $H_2$ production doubles the power output of any existing coal power plant with the $H_2$ used for gas turbine power (See U.S. Pat. No. 7,282,189).

In summary, this technology enables continued use of existing coal power plants, with total $CO_2$ sequestration, and doubling their power output with $H_2$. Adding the additional co-benefit of cementitious slag provides a unique net profitable solution of $CO_2$ removal in a shorter time frame by years and decades than any other $CO_2$ technology currently under development. The other patent (U.S. Pat. No. 7,553,463) with $CO_2$ reduction teaches a means of preparing $CO_2$ for sequestration by using limestone at the coal power plant to form limestone emulsions.

SUMMARY OF THE INVENTION

A process whereby fly ash-carbon mixtures, or de-volatilized coal char, or anthracite coal culm is co-fired in an air-cooled, slagging combustor with limestone or similar slag fluxing materials to convert the ash into cementitious slag with properties similar to ground granulated blast furnace slag. The cementitious slag partly or totally replaces Portland cement production, and the avoided carbon dioxide emission from the Portland cement kilns is credited to the air-cooled, slagging combustor operation. Carbon dioxide in the combustion gas exhaust is dissolved in water to form carbonic acid, which is compressed and injected into underground limestone formations below potable water depths for permanent sequestration as calcium bicarbonate. The method is preferably implemented at specialized coal power plants located above underground limestone formations to avoid the need to transport gaseous or liquid carbon dioxide to the limestone sequestration site. The combustors and their heat recovery boilers are situated in stand alone electric power generating plants A method for Ocean islands whereby the solids listed above are delivered to air-cooled slagging combustor fired power plants and the carbon dioxide recovered from the combustion gases is converted into calcium bi-carbonate emulsions that are injected in the ocean for sequestration and the cementitious slag drained from said combustors can be used to make hydraulic cement for concrete to be used for seawall construction.

A method whereby carbon dioxide is liquefied to pressures high enough for fracking in underground shale formations to release natural gas trapped in said shale, and after surface recovery of the carbon dioxide and natural gas and their separation, the carbon dioxide is re-pressurized and re-injected into limestone formations that are located below the shale for sequestration as calcium bi-carbonate.

Anthracite culm located at abandoned mine sites is used in air-cooled slagging combustor power plants placed at the mines or above limestone or saline formations suitable for carbon dioxide sequestration and cementitious slag and electricity production.

The emission controls for $NO_x$, $SO_2$, hazardous trace metals in coal or coal ash, dioxins and furans, are implemented in the air-cooled slagging combustor and in its immediate post-combustion zone, all of which are upstream of the amines or ammonia injection or physical separation of $CO_2$ from the combustion gas exhaust.

$CO_2$ injection into depleted oil or gas wells continues until the total volume of liquid $CO_2$ injected fills the volume of oil or gas previously removed from said wells, and following the filling with $CO_2$ in the space vacated by prior removal of the oil, the subsequent oil or gas extracted will be charged with the $CO_2$ that is emitted during combustion of said oil or gas because it exceeds the amount of $CO_2$ sequestered.

A method whereby the acidified rivers, streams, lakes and water wells in Pennsylvania and other coal mine regions that result from previous mining of coal or gas or oil have their acidity neutralized with the excess limestone beyond that necessary for fluxing the coal ash in slagging combustors and in removing the $SO_2$ and other trace metals and chemicals from combustion products, and in preparing emulsions for $CO_2$ sequestration.

A method whereby coal power plants utilizing air-cooled slagging combustors are placed near sub-bituminous and lignite coal mines in Montana, Wyoming, North and South Dakota, and the carbon dioxide in the combustion exhaust is dissolved in water to form carbonic acid and injected into the Madison limestone formations that underlie said States, and the plant's electricity is sent through transmission to distant industrial and population centers, thereby reducing coal transport by rail to distant power plants.

A method whereby mountaintop mining is implemented by digging pits from the mountain top to the coal seams, without the need for flattening the top of the hill and dumping the overburden into the valley below, and combining part of said overburden with at least 25% of the extracted coal from said seams for combustion in air cooled slagging combustor boilers located nearby and converting the high ash mixture into cementitious slag, and in order to minimize disfiguring the mountaintop, the pit is made as small as possible to enable lowering remote controlled machinery to remove the coal horizontally from the bottom of the pit into the seam in a manner similar to how oil and gas are removed from wells by horizontal drilling, and the added cost of this method is in part or totally offset from cementitious slag sales.

A method where the revenue obtained from power plants erected near Butte, Mont. are utilized to rehabilitate the Berkeley copper mine pit by removing and cleaning its accumulated water, recovering any residual copper ore, and filling the pit with earth.

A method where new power plants, or existing coal power plants that are retrofitted with said methods and processes, utilize the revenue stream generated from co-benefits from the sale of cementitious slag, the sale of avoided $CO_2$ emissions rights arising from replacing Portland cement production, from electricity sales, and from sales of metals produced by reduction of metal oxides by using hydrogen derived from coal volatile matter, all or partly offset their capital and all operating costs, including carbon dioxide sequestration.

A method of producing coal fired electricity with an inherent capacity factor of 80% or above, and sequesters over 80% of its carbon dioxide emissions, which achieves much lower total carbon dioxide emissions than renewable wind and solar power whose capacity factors are mostly well below 50% and must be combined with carbon dioxide emitting natural gas power plants to achieve a combined capacity factor of above 80% which results in higher carbon dioxide emissions than said coal plants.

A method for operating energy systems that emit carbon dioxide that is sequestered in depleted oil or gas wells whereby said sequestration ceases once the injected carbon dioxide fills the void left from previously removed oil or gas, and any subsequent carbon dioxide injection volume will release an equal volume of oil or gas that upon combustion will emit several times more carbon dioxide to the atmosphere that the carbon dioxide sequestered which will then be charged to the well owner's account, unless said excess carbon dioxide is also sequestered elsewhere.

A method where carbon dioxide produced during fossil fuel combustion is chemically bound to processed serpentinite for carbon dioxide sequestration primarily in regions that are in close proximity to serpentinite geologic formations and can be mined more economically than other sequestration processes.

A process whereby refuse derived fuel from municipal waste or its char or shredded waste paper is co-fired at mass flow rates of 20% or less with coal char, or coal culm or carbon content fly ash in an air-cooled slagging combustor under conditions that achieve near total emission control and $CO_2$ sequestration, which will result in a heat rate that is about one half that achievable in mass burn municipal incinerators.

A process whereby refuse derived fuel is gasified indirectly in shell and tube heat exchangers and converted to hydrogen or methane with the remaining char co-fired in the air-cooled slagging combustor.

A method where the hydrogen or methane produced is used as the primary or major auxiliary fuel in municipal mass burning incinerators in place of bulk waste combustion in order to almost double the incinerators capacity factor.

A method of operating coal power plants that produce sufficient revenue to offset the costs associated with achieving near zero emissions to air, land and water from coal fired combustion.

A method to extend the operating life of existing coal fired power plants by operating them after retrofitting them with air-cooled, slagging cyclone combustors and its associated emission controls.

A method of increasing domestic manufacturing and associated jobs by retrofitting existing or new coal fired boilers with air-cooled slagging combustors and operating at near 100% capacity factors all of which reduce electricity costs.

A method for reducing the cost of reducing metal oxides or metal compounds to metals, and the cost of operating other electric furnaces for metals preparation by operating coal fired power plants and co-producing cementitious slag, sequestering carbon dioxide, and by installing metals or metal ore manufacturing facilities at or near metal ore or coal mines or carbon dioxide sequestration locations.

A process whereby the hydrogen produced from the coal volatile matter is used for reduction of metal oxides to metals, including iron and aluminum and other metals suitable for hydrogen reduction, preferably at the coal mine sites and above suitable carbon dioxide sequestration geologic formations, preferably those of limestone.

A process whereby hydrogen produced from coal volatile matter is injected in the post-combustion zone of the coal char, or culm, or carbon-fly ash, or solid waste fuel boiler is used to reduce nitrogen and sulfur and other restricted pollutants.

A method for reducing the municipal waste disposal cost and sharply increasing its thermal efficiency and minimizing its environmental impact by physically separating the non-combustible waste and shipping it to a landfill, and converting all combustible matter to refuse derived fuel and co-firing it with about 80% coal or coal waste in an air-cooled slagging combustor.

A method where disposal of the organic content in municipal waste has a minimal impact on carbon dioxide equivalent emissions compared to landfill because the methane emitted from any landfill has about a two dozen times greater emission signature than carbon dioxide.

BRIEF DESCRIPTION OF THE DRAWINGS

The present invention is described in the detailed description which follows, in reference to the noted plurality of drawings by way of non-limiting examples of exemplary embodiment of the present invention.

FIG. 1: Photograph of 20 MMBtu/hr air-cooled slagging coal combustor-boiler

FIG. 2: Sketch of 20 MMBtu/hr slagging coal combustor

FIG. 3: Sketch of 20 MMBtu/hr coal combustor-gas design boiler-500 kW steam turbine, FIG. 4: Mercury in Bituminous coal ash pyrites (U.S. Geologic Survey)

FIG. 5: Streams and fisheries impacted by acid mine drainage in Pennsylvania.

FIG. 6: Distribution of limestone formations in the Madison Group in four Western States.

FIG. 7: U.S. Wind Resources are mostly suitable in Central States and offshore.

FIG. 8: PA Total and Industrial Power-1990-2008 (DOE)

FIG. 9: States that would lose the most from Congress Climate Bill (NMA)

FIG. 10: Manufacturing employment in Pennsylvania-1990-2009 (U.S.-B.L.S.)

DETAILED DESCRIPTION

The Genesis of the Present Invention:

The present invention discloses co-benefit methods and processes that can be integrated in electricity generation, such as production of cementitious slag in an air-cooled slagging combustor that reduce the cost of sequestration of $CO_2$ to the point of producing a profit.

One important requirement in uncovering real co-benefits to $CO_2$ sequestration is that the $CO_2$ injected in one location did not result in the release of $CO_2$ in another location. This requirement was stated in a very confusing manner in a very lengthy United Nations IPCC Committee Report on $CO_2$ Capture in Chapter 7.3.1, as follows:

"The use of captured $CO_2$ must not simply replace a source of $CO_2$ that would then be vented to the atmosphere. Replacement of $CO_2$ derived from lime kilns or a fermentation process would not lead to a net reduction in $CO_2$ emissions, while on the other hand replacement of $CO_2$ derived from natural geological deposits, which would thus be left undisturbed, would lead to a new reduction of $CO_2$ emissions. This would apply to the majority of $CO_2$ used for enhanced oil recovery (EOR) in the USA that is currently provided from natural geologic deposits."

The $3^{rd}$ sentence appears to contradict the first two sentences. The $1^{st}$ sentence states: "captured $CO_2$ must not replace another source of $CO_2$ vented to the atmosphere." The $2^{nd}$ sentence states: "replacement of $CO_2$ from a natural geologic source would lead to new reduction of $CO_2$". The $3^{rd}$ sentence states: "This would apply to the "majority" (Inventor's emphasis) of EOR", which implies that $CO_2$ formed on combustion of oil, which emits a net of 2.5 more $CO_2$ (as shown below) than the $CO_2$ sequestered, is acceptable. This contradicts the first sentences that this is not acceptable. Does "majority" mean that this is the $CO_2$ that fills the void left from previously extracted oil that must be filled before new oil flows out, as is explained below? In that case, EOR should not be used because when the oil comes to the surface geologic deposits are disturbed and $CO_2$ is emitted when the oil is burned. So how does DOE's program the bulk of whose $CO_2$ comes from coal burning power plants for EOR differ from limekilns?

All these points are important to explain the difference between the current DOE $CO_2$ reduction from coal power projects from the methods disclosed in this invention and related patents. For example, this invention quantifies the $CO_2$ sequestered and the co-benefits, some which are an integral part of the coal combustion process, such as cementitious slag production.

To demonstrate the difference between this invention's $CO_2$ removal methods and processes from other methods and process, this invention is contrasted with the many projects, most of which deal with EOR, that the Department of Energy (DOE) selected in Solicitations in late 2008 and in 2009 are given herein. To sharpen the contrast, this Invention also summarizes this inventor's approach to DOE's June 2009 solicitation, which had the following 5 key requirements:

1) At least 300,000 tons of $CO_2$ must be sequestered or put to beneficial use.

2) Coal or coal waste must be at least 55% of the fuel

3) The majority of the heat input must be used for electricity production.

4) The cost of electricity must not exceed 10% over current cost of coal-fired power.

5) DOE would provide a maximum of 50% of the project cost and private the rest.

Although the Inventor's Company, Coal Tech could not meet Item 5 and therefore submit a compliant proposal, it was of interest to develop a comparison between this Inventor's $CO_2$ removal Patents, especially U.S. Pat. No. 7,435,400 and technology disclosed in this Invention and those proposed by groups selected by DOE. This selection process was essentially completed in December 2009 because the dozens of projects selected on a preliminary basis described the technology they would use. From examination of the DOE awards, it is clear that no one else submitted a process that is anywhere near that disclosed herein, especially since this air-cooled combustor is unique.

The DOE selections show that the currently favored $CO_2$ sequestration process is Enhanced Oil Recovery (EOR), with sequestration in saline formations a distant second.

In the summer of 2009 DOE selected two EOR projects. One was $100 million as DOE's share at the Antelope coal power plant in ND for sequestration of 1 million tons per year in a Canadian oil field. This project will be compared below with 1.4 million tons annually of $CO_2$ sequestration that can be obtained using the Inventor's technology. The other project was a coal gasification power plant project with 2 million tons EOR sequestration in CA with $308 as DOE's share. Then in December 2009 DOE selected three more projects with DOE's share about $1 billion that are led by three major utilities, each of which will sequester 1 million tons of $CO_2$, two by EOR and one by saline sequestration. The estimated total cost with non-DOE funds is about $5 to $6 billion.

Also, on Oct. 2, 2009 DOE announced 12 pre-awards of $21.6 million, (with the winners committed to provide an equal sum), with final selection in mid-2010, again most of them dealt with EOR and amine processes. Another dozen awards of about $70 million were announced a few weeks earlier, and they all dealt with site selection studies for saline sequestration All these awards clearly demonstrate that EOR followed by saline sequestration are the favored processes.

Another issue is the processes for extracting $CO_2$ from the coal combustor exhaust gases. Here the bidders selected amine or ammonia for $CO_2$ separation or coal gasification, which is very inefficient and expensive Not stated in these releases is the problem with EOR, namely once the $CO_2$ fills the void left from previous oil extraction and the $CO_2$ begins to push out oil from the well, the law of conservation of volume governs EOR in that one gallon of liquid $CO_2$ injected will remove one gallon of oil. Based on the difference of specific gravity of liquid $CO_2$ and oil and its 85.5% carbon content, one calculates that one pound of $CO_2$ will release 0.7 pounds of carbon in the oil. When this oil is burned, the oil will release about 3.5 pounds of $CO_2$ for every 1 pound of $CO_2$ injected for a net $CO_2$ increase into the atmosphere of 2.5 tons. Therefore, EOR is a $CO_2$ production process, not a $CO_2$ reduction process once the total accounting of $CO_2$ in and out of the ground is made, a point that is not raised in these releases, nor mentioned in the UN IPCC Report.

As for saline solutions, a report by the DOE's Berkeley (CA) Laboratory noted that liquid $CO_2$ is less dense than saline solutions, which means that the injected $CO_2$ will float to the top of the saline formation. It could break through if any openings exist in the solid coverage rock formations over the saline formation. Therefore, any hazardous trace metals, such as arsenic, could contaminate deep potable water formations. Whether that will or will not happen is irrelevant, the possibility alone is sufficient to result in lengthy litigation.

One question concerns the economics of $CO_2$ sequestration with EOR and saline solutions. The economics of EOR are very favorable, especially if the price of oil is high, and provided one ignores the $CO_2$ emitted on combustion of the extracted oil. EOR oil's profits are so high that even the high cost of amine separation of $CO_2$ is not a barrier problem.

However, saline sequestration yields no co-benefits. An indication of this cost can be drawn from an article in the Wall Street Journal on Dec. 9, 2009, five days after DOE announced the three $1 billion awards. The CEO of one of the selected utilities stated that $CO_2$ sequestration can be readily met, although the price of electricity will have to double from 4 cents/kWh to 8 c/kWh, a 100% increase. This statement contradicts the solicitation, which specified that the cost of electricity could not increase by more that 10%. Therefore, their proposal should have been rejected for failure to meet the solicitation requirements. However, it could be, as the article stated, that the CEO was counting on a special "earmark" passed by the House of Representatives that would allow this utility to collect up to $90 per ton of sequestered $CO_2$, which equals $90/MWH. Since the wholesale electricity price in this utility's territory was $38.26 per MWH, this "earmark" will produce huge profits to the utility.

Application of the DOE $CO_2$ Solicitation Requirements to this Inventor's Technology As noted above, to contrast the Inventor's $CO_2$ processes from DOE's selections this Inventor prepared a proposal document in August 2009 that met 4 of the 5 specifications set by DOE. To achieve at least 300,000 tons annual $CO_2$ removal, a 20 MW power plant to be fired with the unburned carbon in fly ash from the ash collection system in a nearby central station coal, would be erected. Limestone would be co-injected for $SO_2$ removal and for conditioning the ash into marketable cementitious slag. 25% of the thermal input would melt the ash and the remaining 75% would produce electricity from the steam boiler to which the air-cooled slagging combustors would be attached.

The $CO_2$ removal consisted of sequestration of 165,926 tons in underground limestone formations and a co-benefit of 135,590 tons of $CO_2$ avoided by replacing the same amount of Portland cement, which emits 0.85 tons of $CO_2$ per ton of cement. The estimated capital cost of this 20 MW power plant would be about equal to one year's revenue from slag sales, electricity sales and $CO_2$ sales at $20 per ton.

By replacing the unburned carbon content fly ash with coal, the latter's volatile matter would be converted to hydrogen and the $CO_2$ from the limestone calcination in the hydrogen conversion process would be sequestered with the $CO_2$ from the char combustion in the slagging combustor boiler. As a result about 400,000 tons of $CO_2$ would be totally removed, equal one-third above DOE's 300,000 ton requirement.

More detailed quantified data on this proposal is given below to show how to apply this invention to a 20 MW coal power plant.

Other Events that Led to the Present Invention

Another factor that led to the present invention is a result of a series of unusual events that occurred in the short time span since early 2008, most of which might have been mitigated or even avoided if these ten patents has been used.

a) In February 2008, the US Court of Appeals in Washington D.C. voided EPA's Mercury Rule (CAMR) in part because EPA listed ash waste that contained mercury as a Rule 111 non-hazardous, instead of a Rule 112 hazardous waste that requires very costly (about $150 per ton) disposal in hazardous waste landfills. Ash vitrification in the air-cooled, slagging combustor (U.S. Pat. No. 7,247,285) would solve this problem.

b) In June 2008, this same Court voided EPA's $NO_x$ Interstate Rule (CAIR) on grounds that one cannot purchase rights to ship pollutants interstate. As noted above, smaller (under 300 MW) power plants cannot justify the (~$400/kW) cost of SCR for $NO_x$ and FGD for $SO_2$. The above cited very low cost Patents for $NO_x$ and $SO_2$, (U.S. Pat. No. 7,553,463, U.S. Pat. No. 7,435,400, U.S. Pat. No. 7,282,189, and U.S. Pat. No. 7,247,255) offer solutions for both large and small power plants.

c) On Dec. 22, 2008, an accidental spill of one billion gallons from one ash pond on to surrounding land and river at the TVA Kingston, Tenn., coal power plant took place. TVA estimated it could cost up to about $825 million for the cleanup. The ash vitrification process in the air-cooled, slagging coal combustor (U.S. Pat. No. 7,247,285), which converts fly ash to inert slag while trapping hazardous metals, would have prevented this disaster.

d) On March 2009, following hearings on the TVA ash spill in the U.S. Senate, EPA requested that all coal fired power plants, which produce over 100 million tons of coal ash annually, report on their on-site ash storage procedures. In June 2009, EPA listed 26 coal power plants that contain fly ash ponds that present a hazardous ash spill potential. These plants contain 66 coal-fired boilers, with about 23,800 MW capacity, 174 million MW-hr of electricity output, emissions of 164 million tons of $CO_2$, and 7.2 million tons of fly ash annually. Here again converting the fly ash into cementitious slag in the air cooled slagging combustor would result in 9.6 million tons of cementitious slag with properties similar to ground granulated blast furnace slag (GGBFS) (U.S. Pat. No. 7,247,285). At a current market value at $100 per ton, GGBFS would be valued at $960 million. Thus use of the air-cooled slagging combustors would be very profitable even without $CO_2$ removal.

e) In June 2009, the US House of Representatives passed a Bill to control $CO_2$ emissions with Cap and Trade. It is still in Committee in the Senate with uncertain prospects. However, EPA is proceeding with proposed regulations of $CO_2$ under the Clean Air Act, a decision that is opposed by the industry and by part of the Congress. However, the technology in the present Invention and the related patents and the Inventor's other Provisional Applications could be immediately applied to $CO_2$ removal.

DETAILS OF THE INVENTION

The ten patents cited herein teach by specific examples how to design a new power plant or retrofit to existing coal fired power plants the air-cooled slagging combustor in order to achieve near zero air emissions including $CO_2$ removal and sequestration in underground limestone formations beneath or near the plant. An aspect of this invention is the economic benefit of production of high value cementitious slag while producing electricity, which together convert $CO_2$ sequestration costs into profit. This process is unique over all other $CO_2$ removal processes, especially over Enhanced Oil Recovery (EOR) because the oil that is extracted from EOR emits 2.5 tons net of $CO_2$ during oil combustion for every ton of $CO_2$ sequestered. Once the void from previously removed oil is filled with new liquid $CO_2$, all added $CO_2$ with its molecular weight of 44 releases oil consisting of about 85% carbon whose molecular weight is 12. This ratio is 3.67 for $CO_2$ over C. That leaves a ratio of 2.5 ratio of $CO_2$ when the new oil is burned, after accounting for the different densities and carbon content in oil and carbon.

The present Invention discloses examples on how to practice this invention in with the use of items from the prior said ten patents, namely:

a) Fly Ash Conversion to Cementitious Slag with $CO_2$ Sequestration and Offsets:

The standard practice for coal fired utility boilers has been to store fly ash, which is about 85% of the ash in coal, in wet ponds at the power plant. A small fraction of the fly ash is sold for cement production. EPA approved both practices because it fell under Rule 111 as a non-hazardous material, even though it contained hazardous trace metals, such as arsenic and mercury. As stated above, all this changed in February 2008 when the US Appellate Court ruled that waste generated by the use of Activated Carbon Injection (ACI) to remove mercury should be considered as a Rule 112 hazardous waste, which costs about $150 per ton to dispose in hazardous landfills. EPA has been investigating this issue and to date has not issued a final rule. Separately, in mid-2009 EPA issued a preliminary ruling that ACI containing mercury could not be used as an additive in cement manufacturing. This places a strong restriction on the beneficial use of coal fly ash.

Also, as noted above, a much more serious setback to utility fly ash disposal occurred on Dec. 22, 2008 when one billion gallons from the TVA Kingston coal power plant spilled from an ash pond and covered the adjoining land and entered a river. TVA estimated the cleanup cost at $825 million. Then in June 2009 EPA listed 26 facilities whose fly ash ponds may present a hazardous risk from an ash spill. Using EPA's published data on annual emissions from power plants for 2007, one finds that these cited plants contain 66 coal-fired boilers, with about 23,800 MW capacity, that produced 174 million MW-hr of electricity, 164 million tons of $CO_2$, and 7.2 million tons of fly ash, based on average properties of bituminous coal.

If instead of collecting this fly ash, it would have been converted to slag in the air-cooled slagging combustor, which would include co-injection of limestone, as described in U.S. Pat. No. 7,553,463, and U.S. Pat. No. 7,247,285, the result would have been 9.6 million tons of cementitious slag, similar to blast furnace slag, with a current market value of $100 per ton, for a total of $960 million. Thus installing this combustor in small boilers to process the fly ash would have been very profitable, even without $CO_2$ removal.

As noted, this combustor can operate with only pulverized carbon as a fuel, supplied from either unburned carbon in fly ash from coal fired boilers operating with "low $NO_x$" burners. By operating these burners at 0.6 to 0.8 fuel-rich stoichiometry, the carbon concentrations in fly ash can approach 20% (See U.S. Pat. No. 7,247,2850). Alternatively, also described in said patent, the fuel could be char from devolatilized coal Since carbon is the fuel, the exhaust combustion gases consist of 20% $CO_2$ by volume and 29% by weight, with the balance nitrogen. This high $CO_2$ concentration makes physical separation of $CO_2$ from $N_2$ economical and eliminates the need for inefficient and costly amine or ammonia separation. A very conservative 2 MMBtu is twice the energy needed to melt a ton of ash and limestone to produce slag. Also, to provide excess energy to assure effective conversion of the ash to slag, 8 MMBtu per ton of ash, i.e., 400% excess energy is provided to the combustor. The 75% excess energy is used for electricity production. As a result, a total 8.9 million tons of $CO_2$ per year would be produced annually from the fly ash vitrification. The $CO_2$ in the exhaust would be separated from $N_2$ by compression and solution in water to form carbonic acid and sequestered in underground limestone formations. Furthermore, since the cementitious slag displaces an equal amount of cement production, it thereby eliminates the 0.85 tons of $CO_2$ emitted per ton of conventional Portland cement production. Therefore, by converting the fly ash to slag in the 26 power plants cited by EPA, a total of 17 million tons of $CO_2$ would be sequestered and put to beneficial use from avoided cement production. This represents a 10.3% reduction from the $CO_2$ output of these 66 boilers. Therefore, the threat of an ash spill is removed and converted into large profits from cementitious slag sales, whose properties are similar to GGBFS. At the same time, one-half of the 20% target reduction of $CO_2$ in the current proposed legislation in Congress for 2020 would be profitably in a few years.

The same procedure could be used for all TVA's 58 coal-fired boilers, which were not on EPA's June 2009 list of dangerous ash pond storage. Their specifications are 12,606 MW, 98,023,129 MW-hr, 96,726,164 tons of $CO_2$, 4,266,121 tons of ash resulting in 5,673,941 tons of cementitious slag. 5,057,014 tons of $CO_2$ to be sequestered, plus an offset credit of 4,822,850 tons from avoided $CO_2$ in cement production, for a total 9,87,864 tons of $CO_2$ removed. This equals 10.21% of TVA's total $CO_2$ emission.

In fact this same procedure could be most probably applied to the nominal 100 million tons of fly ash produced by all US coal-fired boilers, which would reduce the 2 billion tons of $CO_2$ emitted by all US coal plants by at least by 10%. This is not an unrealistic scenario because the total U.S. Portland cement production is about 100 million tons annually, and the worldwide production is near two billion tons. Since the US imports a substantial quantity of Portland cement, the U.S., would become a net exporter of high value GGBFS type cement.

Again these slagging combustor-boiler facilities would be constructed and operated independently of the existing coal power plants, and located above or near deep underground limestone formation, which almost certainly exists in much of the US.

Also, operating the existing coal fired power plants to produce 20% unburned carbon can double the near term 10% $CO_2$ reduction goal under consideration by the US Government. However, that may not be necessary if the volatile matter in the coal is converted to hydrogen, in which case the power output of the slag production plant could be doubled with total $CO_2$ removal.

To repeat, the procedures by which the slag production, electricity generation, and $CO_2$ removal are implemented as described in said patents with the following elaborations and modifications:

Fly ash collected from coal fired utility boilers would be converted into cementitious cement in air-cooled slagging combustors using either coal char from pyrolized coal or the unburned carbon in the fly ash as the fuel, and optionally augmented with RDF. As can be deduced from U.S. Pat. No. 7,282,189, the process would be implemented in a standalone plant located above underground limestone formations for $CO_2$ sequestration, as near the existing power utility power plant as possible. If not, the fly ash can be transported by truck or rail to a suitable site. This is far superior in terms of safety and cost than the currently proposed and being implemented in demonstration facilities of using liquid carbon dioxide pipelines, whose rupture could cause a disaster in a populated area. $CO_2$ is heavier than air and a break in the pipeline will stay on the ground and could suffocate anyone inside its extended area.

Only carbon is needed as a fuel. Therefore, if solid char consisting of carbon and ash is used as the fuel in the slagging combustor, the volatile matter in the coal would be first separated by pyrolysis and converted to hydrogen. This devolatilization is not normal gasification in that it occurs at gas temperatures of about 1500° F. to 1800° F. instead of 3000° F. This allows the use of metal shell and tube pyrolysis vessels, as described in Zauderer's U.S. Pat. No. 7,282,189, and U.S. Pat. No. 7,553,463. The $H_2$ from the coal volatile matter could be used in gas turbines, of which there is about 75% of unused installed capacity in the USA. The gas turbines could be used as a topping unit to the slagging combustor, or preferably in a separate combined cycle. The hydrogen could also be used as a modest augmentation of the carbon combustion in the slagging combustor, as the product would be water vapor, not $CO_2$. As shown by calculations in the U.S. Pat. No. 7,282,189, the result would be a doubling of the electric output of existing coal power plants even after deducting the power consumption for $CO_2$ capture and sequestration, which is about 14% in a 100 MW coal plant whose output is doubled to 200 MW. The overall result would be zero emissions from coal power at substantially lower electricity prices than at present.

Once sufficient operating experience in these small slag production power plants is obtained over several years, the next step would be to retrofit existing coal power plants in all sizes with multiple slagging combustors. The $CO_2$ produced during hydrogen production would be sequestered with the $CO_2$ from the char fired primary boilers, as described in U.S. Pat. No. 7,282,189. Alternatively, if the $CO_2$ from the hydrogen production has little of no nitrogen content, it could be sequestered in a separate stream.

20 MW Prototype Fly Ash to Slag Production Power Plant:

The following discloses an example prototype coal or coal waste electric power plant for slag production with near zero emission control with $CO_2$ sequestration using the technology disclosed in the present invention and in the other patents cited herein. The prototype is rated at a nominal 20 MW plant. It would process the fly ash produced by a 430 MW coal fired power plant. The 20 MW size is selected because as part of a DOE test effort by this Inventor's Company, Coal Tech Corp, on an advanced design of the air-cooled slagging combustor originally patented (U.S. Pat. No. 4,624,191) in the early 1990's, an engineering firm was retained to prepare a preliminary detailed design and cost analysis for a 20 MW natural gas turbine-coal fired steam turbine, combined cycle coal power plant. This design would be similar to a prototype plant that would be designed to demonstrate the cementitious slag production with total emission control and sequestration technology. The engineering firm also performed a design and cost analysis of the air-cooled, slagging combustor that would be retrofitted to a 20 MW oil or gas design boiler. The fuel would be high ash (over 40%) anthracite culm fired in two slagging combustors attached to two oil design boilers, whose steam output would drive a low pressure, condensing 20 MW steam turbine.

For the fly ash to slag conversion applications, the following items are included:

a) The oil/gas design steam boiler would be fired by unburned carbon in fly ash collected in a utility power plant's ash collection units.

b) The carbon provides the ash melting energy inside the air-cooled slagging combustor and converts the ash into granulated slag cement.

c) In addition to $CO_2$ sequestration from the carbon combustion, this marketable cementitious slag production avoids 0.85 tons of $CO_2$ that would be released in Portland cement production.

d) Increasing ash increases capture of volatile trace metals in coals, including lead, arsenic, sulfur, selenium, barium, zinc, and mercury, as shown in FIG. 2 in U.S. Pat. No. 7,247,285 for Pb and As. In Bituminous coals the mercury and arsenic are in the mineral pyrites, as in FIG. 14, U.S. Pat. No. 7,553,463, and FIG. 4 herein, which facilitates mercury capture. However, in sub-bituminous and lignite coals, the mercury is monatomic in the organic matter and it would be captured by injection of a getter, either Activated Carbon Injection (ACI) and or calcium oxide, which would then be vitrified by injection in the air-cooled, slagging, combustor.

e) $NO_x$, $SO_2$, dioxins, and furans are partially reduced in the combustor, as disclosed in the cited ten patents.

f) It is strongly emphasized that total removal of all the cited pollutants, which are listed for every coal fired boiler in TRI (Toxic Release Inventory) Reports to EPA, are an integral part of this sequestration technology. For example, the high ash mass flow rate in the combustor facilitates the total removal of all volatile trace metals. Chinese and Indian coals have very high ash and would benefit from this technology.

g) The rest of these pollutants that exit the slagging combustor are removed by post-combustion reagent injection, such as urea for $NO_x$ and lime for $SO_2$. $NO_x$ is further reduced by post-combustion reburn, upstream of the superheater section of the boiler. The result is that these emissions are reduced to the levels attained by Selective Catalytic Reduction (SCR) for $NO_x$, and by over 80% for medium and low sulfur coals.

h) The remaining combustion gases consisting of 20% $CO_2$ and 80% $N_2$ are cooled to ambient conditions and compressed and dispersed in water, followed by separation of the $N_2$ whose compression power is almost all recovered by expansion though a turbine to atmospheric pressure. The remaining carbonated water is pumped into limestone formations below potable water tables located at or beneath the power plant for permanent sequestration as calcium-hydrogen-carbonate, also called calcium bi-carbonate.

i) Following the successful operation of the slagging combustion phase, as per the above tasks, the hydrogen production from coal volatile matter would be installed and tested. As described below, this consists of devolatilization of coal and converting its volatile matter to hydrogen by reaction with calcium oxide that is calcined in separate vessels at the plant. As per U.S. Pat. No. 7,282,189, limestone formed during the hydrogen production step is recycled to the calciner, and the $CO_2$ released during the limestone calcination is sequestered with the $CO_2$ separated from the char combustion in the slagging combustor. The hydrogen will be diluted with nitrogen and fired in a gas turbine. The char or carbon that is fired in the slagging combustor produces steam for driving a turbine-electric generator.

j) The above design utilizes a conservative heat input of 2 MMBtu per ton of slag produced, which is double the theoretical ash melting energy. Allocating only 25% of the fuel energy to slag production further increases this conservative assumption. The remaining 75% of fuel energy is for electricity production. This allocation of electricity is for the steam part of the MW power plant.

k) Following full commercial use of the slag production from fly ash, the air-cooled slagging combustors can be retrofitted in most existing coal fired power plants. This combined cycle can double the power output of existing coal-fired steam boiler plants, even after deduction of the sequestration power of the $CO_2$ Summary Technical & Economic Performance of a 20 MW Ash to Slag Power Plant The following calculations show the technical and economic performance of a nominal 20 MW plant that converts the fly ash from a 430 MW into GGBFC slag, and provides revenues from sale of the cementitious slag, sale of electricity at $50/Mw-hr, and a $CO_2$ cap and trade emission credit sale at $20/ton. It includes a 14% deduction for $CO_2$ sequestration. The calculation in Case 1 uses only unburned carbon in the fly ash as the fuel. In Case 2 the fuel is raw Bituminous coal with its pyrolized volatile matter converted to hydrogen to operate a gas turbine, and the remaining char used in the slagging coal combustor-boiler to convert the fly ash to cementitious slag.

Case 1: EPA reported that in 2008, the selected 430 MW coal power plant produced 2,275,100 MWH, and generated 2,707,244 tons of $CO_2$, and about 119,938 tons of ash. In the 20 MW plant, this ash is converted to 159,517 tons of cementatious slag, which provides a $CO_2$ offset of 135,590 tons. The fuel is unburned carbon in the fly ash, which is produced by operating the main power plant boilers fuel rich, and results in 197,027 tons of $CO_2$, for a total of 332,616 tons of $CO_2$, which equals 12.29% of the 430 MW plant's $CO_2$ emissions. Since only 25% of the carbon fuel is allocated to slag formation, the remaining 75% can produce 89,737 MWH of electricity, which equals 3.63% of the 430 MW plant's generation.

Case 2: In this case, instead of using the carbon in ash produced by the 430 MW plant, raw coal is used. This has an important benefit. By operating at slightly excess air combustion unburned carbon in the ash, which blackens the slag, is eliminated and white slag is produced, which has a higher value as GGBFS. In this case, the hydrogen generated from the volatile matter is used to generate 94,915 MW-hr in a gas turbine, and 85,647 MW-Hr is generated in the slagging combustor driven steam turbine. The total of 180,262 MWH is reduced by 14% for $CO_2$ sequestration, resulting in a net 155,025 MWH, equal to 6.26% of the 430 MW power output.

The estimated cost of the 20 MW plant is $30 million. Slag sales at $100/ton yield $15,951,746, electricity at $50/MW-Hr yields $7,756,616, and assuming $CO_2$ cap and trade at $20/ton, yields $7,761,255. (This is a small fraction of the estimated cost by MIT of $74/ton of $CO_2$ for existing plants and $52.2/ton in advanced design power plants.) The total annual total revenue of $31,469,617 exceeds the cost of the plant. If instead of new components, used equipment were used, such as used boilers, sharing coal-handling equipment from the power plant, etc., the annual revenues would substantially exceed the power plant cost. Further $CO_2$ sequestration could be achieved by simply increasing the fuel input.

Converting Fly Ash Generated and Stored at US Coal Plants to Cementitious Slag

The first application of cementitious slag production from fly ash, as described in the previous section, will most probably be in the 66 coal-fired power plant boilers identified by EPA as having a high hazardous ash spill potential. As stated above, these boilers could produce an estimated 9.6 million tons of GGBFS cement type slag with an estimated current market value of $960 million. Assuming 25% of the unburned carbon energy in the fly ash is applied to slag production, and the balance to electricity production, the result would be 8.9 million tons of $CO_2$ plus a 0.85 tons of $CO_2$ per ton of Portland cement $CO_2$ offset credit. This results in a total of 17 million tons of $CO_2$ not emitted to the atmosphere, which equals 10.4% of the total $CO_2$ emissions from the 66 boilers. Also, as noted above, if coal char is used as fuel instead of unburned carbon in the fly ash, and after the pyrolized volatile matter in the coal has been converted to hydrogen for gas turbine use, and the $CO_2$ generated in the hydrogen production is also sequestered, then the electricity output of this slagging combustor-boiler would be almost doubled, with essentially zero emissions.

Also as noted above, this process can be applied to most coal-fired boilers. One example given above was applied to all the TVA coal fired boilers. This would result in 5,673,941 tons of slag and 9,879,864 tons of $CO_2$ sequestered. This would equal to 10.21% of the total $CO_2$ emissions of all 58 TVA coal-fired boilers. Here again by using char, from raw coal as the slagging combustor fuel, and generating hydrogen from devolatilization of the volatile matter in the raw coal, the electric power output of the slagging combustor-boiler would be doubled.

Further increases in power output can be achieved by increasing the capacity of all the plant components. In this way it should be possible to achieve 20% $CO_2$ reduction in a matter of a few years after operating experience in the operation of this system has been obtained.

This slag production technology can be applied to all coal fired power plants. According to an EPA study released on Dec. 17, 2008, US coal power plants generated 71.7 million tons of fly ash in 2007, of which 3.6 million tons were used in cement kilns, 40.07 million tons were land filled, and 28.03 million tons were put to other uses. Also, it was estimated that by 2006, 100 to 500 million tons of ash were stockpiled at various locations. This has as of 2010 not occurred due to objections by the coal burning utilities.

Converting this entire annual ash production to slag similar to GGBFC would yield about 100 million tons of slag, including the limestone slag conditioner. This would equal the annual Portland cement production in the US, which is 5% of worldwide production. Cement experts have noted that it is cheaper to ship cement per ton from the US across the Atlantic by ship than several 100 miles by land transport. GGBFC is a premium high strength as well as potentially hydraulic cement. Therefore, there will be a ready National and export market for this product, which could be used in concrete barriers to impede rising seas or oil spill contaminated water. Adding the minimum 75% energy for electricity production would result in about 200 million tons of $CO_2$ sequestered and cement offsets. This is about 10% of the 2 billion tons of $CO_2$ emitted annually by coal-fired power plants. However, long before that event, existing coal-fired boilers could be retrofitted with slagging combustors fired by coal char, after the volatile matter was used for hydrogen production. The result would be near zero $CO_2$ emissions from existing coal power plants, which are currently emitting 2 billion tons annually . . . .

One very critical point must be made in connection with using fly ash in cement production, as opposed to the present use as cement filler. EPA is proposing eliminating the use of fly ash that contains mercury captured with ACI because the mercury could be re-emitted in the cement kilns. As noted above, in Bituminous coals, mercury is in the coal pyrites and correlates with the arsenic (FIG. 4 herein and FIG. 14. in U.S. Pat. No. 7,553,463). Also, FIG. 2 in U.S. Pat. No. 7,247,285 shows test data in the 20 MMBtu/hr air-cooled combustor in which arsenic retention in slag increased with increasing fly ash injection. Therefore, operating the combustor with high ash throughput levels is advantageous for removal of all hazardous trace metals.

In late 2009 EPA updated an expanded list of coal power plants that use ash impoundments at the power plant. 219 facilities have 584 surface ash impoundments. Of these 194 units (33%) have a potential hazard rating under the National Inventory of Dams. Of these 194 units, 49 are rated as High Hazard Potential, 60 as Significant Hazard Potential, 77 as Low Hazard Potential, and 8 units as less than that. The other 390 units (67%) have not received a hazard rating. For all these ash ponds, the present slag production can be used on economic grounds, irrespective of any hazard. Also, the EPA release noted that the height of the ash storage units varies a great deal. 75 units (13%) are over 50 feet in height, 120 units are over 25 feet, 251 are over 6 feet and less than 26 feet, 30 units are less than 7 feet, and 100 units have no height. Again most of these units would benefit from the present ash to GGBFS process. This is especially the case because the slag production process also offers zero emissions with sequestration that could meet within a few years the year 2020 $CO_2$ emission target under consideration in Congress, and most important, it would yield substantial added revenue.

Conversion of Anthracite Culm to Cementitious Slag

The above slag production technology also finds a unique application to recover the billions of tons of anthracite culm, which contain substantial carbon. The culm in Pennsylvania is the result of two centuries of now defunct anthracite mining. Since anthracite was mostly used as a heating fuel, mine operators used children to separate the mineral matter and fine carbon from the various size pebbles that were used for heating in furnaces. As a result, many of the numerous mine sites have anthracite waste called culm. Culm with about 75% carbon is still used to a limited extent as a fuel in industrial and modest (up to 100 MW electric output) furnaces or fluid bed boilers. In fluid beds, even 50% carbon or even less can be used. Furthermore, due to difficult combustion conditions, the ash from these furnaces can contain 15% or even up to 40% carbon, and one 600 MW fluid bed boiler uses such a pile with decades of accumulated culm as the fuel. It must be emphasized, however, that the use of a previously combusted coal waste pile differs greatly from a raw pile of previously unburned culm. In the previously burned culm, the mercury in the ash was almost certainly been mostly burned off, while in the latter unburned culm, it is still there. This is a very important distinction because anthracite has high mercury content in its ash. One proof that the previously burned culm has burned off its mercury can be deduced from the Toxic Release Inventory (TRI) for mercury, which must be reported regularly to EPA. The reported TRI for mercury in the solid mineral matter in the 600 MW fluid bed boiler is almost negligible, while TRI for Bituminous coals fired in large utility boilers reveals that about one half of the mercury in the original ash remains in the ash collected at the boiler exhaust. The reason for this statement is to question any claim that due to the lower combustion temperatures (about 1600° F.) in fluid bed boilers, the mercury remains trapped in the ash. The claim of mercury retention in the ash removed from a fluid bed boiler that burns raw previously unburned culm can only be proven if the mercury concentration at the boiler culm inlet remains unchanged in the ash collected in the combustion exhaust.

The use of anthracite culm in the air-cooled slagging combustor would be the same as if the fuel were coal char or fly ash with unburned carbon. Therefore, culm with as little as 25% carbon could be used as the fuel to produce cementitious slag. Although the amount available in the ground in Pennsylvania with this composition is not known it can be estimated as huge because there are substantial amounts of culm with 50% carbon, and even with 75% carbon. If the 25% carbon culm needs augmentation, hydrogen from volatile matter in bituminous coal could be co-fired in the slagging combustor. There exists data that the amount of anthracite mined since 1870 was 5,242,083,418 tons. Therefore, it is not unreasonable to assume that culm with as little as 25% carbon could amount to 20,968,333,672 tons, leaving 15,726,250, 254 tons of ash, which would yield 20,915,912,838 tons of cementatious slag. Considering that the US cement production is about 100 million tons annually, this could last 200 year for the entire U.S. or 10 years for the world.

Since the slag cement is also hydraulic it could be used to erect barriers in regions of the World such as the Maldives Islands, which are only a few feet above sea level and could sink with rising sea levels.

It could also be used to erect concrete barriers offshore to protect wetlands, especially now that it has been reported that sand burns in the Gulf coast that were installed to stop the oil spill of mid-2010 were totally ineffective. Concrete walls are effective as proven from those offshore at Galveston, Tex.

Sequestration of the $CO_2$ from Anthracite Culm Combustion:

U.S. Pat. No. 7,282,189 teaches sequestering the $CO_2$ beneath or very near coal power plants. A major geologic fault runs North-South through central Pennsylvania. The Central-Western part of the State has very extensive limestone formations near the surface. While no data has been collected on deep limestone formation, it is highly probably that they exist below the potable water depth, which is under about 2500 feet. Here $CO_2$ in water that forms carbonic acid would be sequestered in limestone formations to form liquid calcium bicarbonate. Therefore, if not exactly under the anthracite culm mine waste, the culm could be shipped by rail or truck to suitable sites nearby.

Marketing the Slag from Anthracite Culm: The GGBFS could be marketed worldwide by ships up to about 40,000-ton displacement from the Delaware River in Philadelphia. In the $19^{th}$ Century, anthracite was barged down the Lehigh and Schuylkill Rivers to the Delaware River where ships docked for miles along the River, north of Central Philadelphia to export the coal. The magnitude of cementitious slag exports would be governed by worldwide market demand. For example, 6 million tons exported in 20,000 tons net cargo capacity ships would only require 7 daily ship sailings annually. The annual revenue for 6 million ton GGBFS slag sales would be at $100/ton equal to $649 million; electricity at $50 per MWH would equal $210 million; and combined with $CO_2$ from sequestration and 0.85 ton offset from avoided cement production at $20 per ton would equal $238 million for a total of $1.0907 billion annually.

A government specialist in this field cited the $100/ton price for the GGBFS. Another industry source cited a price source in the range of Portland cement. However, in view of EPA's 2009 request that fly ash that contains activated carbon with captured mercury not be used as a cement additive and in view of the high $CO_2$ released in cement production, it is probable that all cement prices may increase by about $20/ton to accommodate these two requirements.

Also important is that the slag and electricity could be produced either at the anthracite culm pile near one or more former mines, with sequestration beneath the plant in limestone formations, or the plant could be located above a suitable limestone formation. Since compact oil/design boilers would be used, the entire plant could be relocated after the culm is exhausted to another culm site and the process repeated as each pile is consumed. The 20 MW plant cited above could produce 160,000 tons of slag annually. Therefore, processing 6 million tons would require 39 readily movable plants for 6 million total annual slag production. The frequency of moving a plant will depend on the size of the culm pile. For example, the 600 MW fluid bed boiler power plant that is fired with culm plans to stay in place at least 20 years. Therefore, the moving requirement will most probably be very infrequent.

Matching Cementitious Slag Properties to those of Ground Granulated Blast Furnace Slag:

U.S. Pat. No. 7,553,463 teaches how to select slag properties to match specific performance requirement. The selection begins with the use of Phase diagrams of the metal oxides that constitutes the final slag, which in this case would be primarily alumina, silica, calcium oxide, iron oxide, and magnesium oxide. In addition, U.S. Pat. No. 7,247,285 teaches how to assure that volatile trace metals are vitrified into slag in the air-cooled slagging combustor. It also cites a DOE Project implemented by the present Inventor on fly ash vitrification in which the nominal slag produced by this combustor overlap that of blast furnace slag. Selecting a coal and adjusting the concentration of limestone and also, if necessary, co-injecting other metal oxides, such as iron oxides, the slag properties can be adjusted to overlap those of the blast furnace. Two features were considered by experts in the use of cementitious slag to be less desirable, the black color of the slag, while white GGBFS is desired, and the higher density, of about 80 $lb/ft^3$. However, white may be a preferred use due to the limited availability of blast furnace slag. Also, the slag produced in the air-cooled combustor even under modest fuel rich condition had less that 0.1% of carbon by weight. This should not degrade the beneficial high strength of the slag for numerous infrastructure uses.

However, as noted above, burning fuel lean will consume all the carbon and the slag color may be lighter in color. Also, it is a minor (less than 0.1%) amount of carbon in the ash that discolors the slag, which is a result of operating the combustor under fuel rich conditions to reduce $NO_x$. However, U.S. Pat. No. 7,553,463 teaches how to eliminate carbon by operating the combustor under slightly fuel lean conditions and removing the $NO_x$ with post-combustion SNCR and Reburn. This may result in white slag. The slag density can be adjusted by trial and error by injecting limestone to increase the friability and thereby reduce the density of the slag.

The slag may require additional processing, such as pelletizing and grinding to duplicate GGBFS. However, these requirements are minor compared to the removal of the $CO_2$ emissions and encapsulating volatile trace metals, including mercury and arsenic in the slag in the air-cooled slagging combustor. In contrast, both trace metals and $CO_2$ are generated in blast furnace and Portland cement productions.

Cleaning Pennsylvania's Rivers:

After 200 plus years of anthracite mining in Central and North-Eastern Pennsylvania, leaching from abandoned mines and mine waste has rendered waterways in this region too acidic to support fish and aquatic life. Also volatile trace metals, primarily mercury has made edible fish unsafe for consumption. The US Geologic Survey (USGS) has identified the affected streams and rivers (FIG. 5). FIG. 5 from EPA's fisheries survey shows that of the 54,000 miles of streams and rivers in Pennsylvania 1724 miles have no fish, 1525 miles have some fish as a result of Acid Mine Drainage whose effects reach into Chesapeake Bay. While 6% of the total mileage with none or small fish may be a very small, the contamination is worse because about one half of the waterways have mercury levels in fish that limit their consumption. The State issues one million fishing licenses annually, and hence the recreational and financial impacts are estimated at over $67 million annually.

To find a solution the USGS performed tests in which several river flows were diverted to pass through limestone beds, which restored the acidic pH to normal neutral levels. However, USGS estimates it would cost $5 to $15 billion to restore all the affected waterways in Pennsylvania. Now since the presently disclosed culm to slag conversion will require large amounts of limestone for slag conditioning and $SO_2$ and $CO_2$ emission reductions, and since the affected waterways are within the anthracite culm region, part of the limestone could be used for waterway cleanup at modest cost because the limestone will be processed and available from these other uses. The benefit to fish consumption, tourism, and work to implement the slag and water cleanup will create many thousands of new permanent jobs.

A recent Penn State Report, cited in a MIT Technology Press article (November/December 2009) on natural gas extraction from the Marcellus Shale in Pennsylvania, claimed that $3.8 billion in gas revenue produced presumably in 2009 would create 48,000 jobs that year, which works out to $79,000 per job. Using this annual labor cost benchmark, the 6.5 million tons of slag produced annually and valued at $1.1 billion would produce 13,800 jobs. The shale gas issue is discussed below in connection with $CO_2$ sequestration. In any case, the anthracite culm will also generate taxable income without any government financial support, and without any adverse impact on the land, water and air environment.

Co-Firing RDF with Coal/Coal Waste with Cementitious Slag Production and $CO_2$ Removal The properties and uses of Refuse Derived Fuel (RDF) were discussed in the above, including co-firing RDF with coal in the air-cooled slagging combustor. This Inventor uncovered a new concern namely WTE plants emit very high $CO_2$ emissions, (almost 4 times greater than coal), which means that such plants are unlikely to be built in the future, and may be shut if cap and trade on $CO_2$ is enacted. WTE advocates claim that MSW is "renewable" due to its food content. This "claim overlooks the major emissions of $CO_2$ during agriculture production. Also, it is estimated that 41% of MSW is non-renewable plastic. Also, the thermal efficiencies of WTE plants are very low, which means more MSW must be incinerated per kW of electricity than coal or gas. Therefore, in addition to solving these problems with coal, it is also disclosed here how the life of these WTE plants may be extended and their capacity factor may be increased from the current 50% to at least 80% by the use of clean fuels, such hydrogen from volatile matter in coal or waste coal. The previous section on RDF discloses data and methods on how to practice RDF use.

Aluminum Production: As shown above, the current price of this slag is about $100/ton, and electricity in the PJM grid that includes Pennsylvania, is about $45/MW, which is close to the estimated $50/MW net electricity generated by the 20 MW plant example, and it includes total $CO_2$ sequestration. (This has major implications for the entire metals industry, including steel, which was once a major product in Pennsylvania.) For example, 12 MW of electricity are required per ton of aluminum production. On the London Metal Exchange, the November 2009 spot price for aluminum was about $2000 per metric tone (MT). The historical price of electricity for aluminum production has been 25% or $500/MT. At the 2009 PJM price of $45/MW, the electricity cost would be $540 per MT of aluminum.

In the present application, slag production would yield revenue of $1,064 per metric ton of aluminum, $CO_2$ at $20/ton of $CO_2$ would yield $510 per MT, and electricity at $50/MWH would cost $516/MT. At an aluminum price of $2,000/MT, the $1,570/MT of revenue from culm and $CO_2$ sales, and subtracting a $540 cost of electricity, an aluminum producer would profit by selling above $1030 per MT of aluminum.

However, an alternative use of the electricity is metal production. Using $50/MW as a wholesale price of electricity would yield $600 per MT of aluminum from electricity sales. However, with aluminum selling at $2,000 per ton, it would instead be more profitable to use the electricity for aluminum production. The decision depends on who owns the electricity production. This is what Alcoa did soon after its founding 100 years ago. For example, dams in the Tennessee Valley were erected and owned by Alcoa until taken over by the TVA in the 1930s. Now Alcoa has had to shut down smelters in the Valley and in Texas in part due to high electricity prices. However, with the co-benefits disclosed herein, aluminum, or for that matter refining any other metal may be more profitable, especially if located near very low cost coal mining areas such as the sub-bituminous mines in the West.

Direct Reduction of Metals with Hydrogen.

Hydrogen can be utilized for reducing metals, such as iron, chrome, and aluminum. Since this a thermal process it would avoid part or all costly electricity use. The key requirement is the need for an abundant supply of hydrogen derived from coal volatile matter as disclosed Zauderer's U.S. Pat. No. 7,282,189.

In addition, if $H_2$ is applied to iron oxide, FeO, reduction, the product is water, $H_2O$, as opposed to $CO_2$ from conventional carbon fired blast furnaces, which in addition to the carbon used in the furnace also releases the carbon in the volatile matter as $CO_2$. Therefore, a blast furnace, which is fired by the fixed carbon in coal, which is about one-third of the total carbon in coal, would produce a little over 1 ton of $CO_2$ per ton of iron, (molecular weight=56). According to EIA in 2007 China produced 500 million tons (MMT) of steel, which resulted in about 10% of their total $CO_2$ emissions from coal, Europe produced 200 MMT of steel and 15% of coal $CO_2$, and the U.S.: 98 MMT of steel and 5% of $CO_2$. All this would be removed by using hydrogen reduction. This would especially apply to Europe since that would almost meet their 20% goal of $CO_2$ reduction by 2020.

In case of aluminum, reduction of aluminum oxide with hydrogen, $Al_2O_3+3H_2$, yields $2Al+3H_2O$. This reaction has not been successfully tested at the laboratory scale because, among other factors, hydrogen penetrates the aluminum and cannot be readily removed, and the water vapor must be rapidly and totally removed for the reaction to proceed. Only tiny aluminum modules have been observed in the test crucibles. Nevertheless, the cheap hydrogen from coal volatiles in this invention gives a strong incentive to proceed. In the above equation, 6 tons of hydrogen would yield 54 tons of aluminum, i.e. (9/1). An example showing the huge financial return can be seen from the 27,660 tons of hydrogen calculated from coal devolatilization in the 77 MW ash-to-slag power plant, proposed for the Antelope plant, (seen this Invention below). 27,660 ton of $H_2$ will yields 248.940 tons of aluminum. At the current market price of $2,000 per ton of aluminum, its value would be an astounding $497,880,000, as opposed to only $8,899,294 from the sale hydrogen's electricity sales at $30/MW. Even using this electricity for the Hall process would still be very profitable due to slag sales and $CO_2$ sequestration credit sales.

Steel and Other Non-Ferrous Metals Production:

Any metallurgical process, such as steel production from scrap steel that uses electricity can profit from the present patented technology in that revenue from slag sales and $CO_2$ sequestration and offsets could be several times greater than the cost of electricity used for steel production. This would provide a major cost advantage over imports from regions without strict environmental regulations. An example is the electric arc furnace steel making industry. According to sources that collect steel manufacturing cost data, steel scrap is the major cost item equal to about 60% of the total cost of making steel. Second is the cost of electricity at 11.8% followed by electrodes at 11%, ferroalloys at 6.7% and labor of only 4.8%. Slag sales and $CO_2$ sequestration and offset credits equal about 3 times the cost of electricity, or a 35% negative cost, namely the finished steel can be sold at two-thirds of the cost of producing steel without this technology.

Reduction of iron ore with hydrogen was discussed in the previous sub-section.

Reduction of Pollutants with Hydrogen

The hydrogen produced from coal volatile matter can also be injected in the post-combustion zone of the coal char, or culm, or carbon-fly ash, or solid waste fuel boiler to reduce molecular compounds of nitrogen, such as $NO_x$, or sulfur, such as $SO_2$, and other pollutants whose emissions are reduced by taking advantage of the strong reduction potential of hydrogen, The Worldwide Problem of $CO_2$ Sequestration Before discussing and comparing this Inventor's solutions to $CO_2$ removal with other solutions to $CO_2$ sequestration, it is imperative to define the scope of the $CO_2$ problem. According to Energy Information Administration (EIA) of DOE, in 2006, 2.13 billion tons of $CO_2$ were emitted from coal combustion in the US, China emitted 4.95 billion, and India emitted 0.88 billion. In 2000, the numbers were: 2.13 billion, 2.6 billion, and 0.68 billion tons, respectively. Therefore, China's $CO_2$ increase in these 6 years exceeded the total annual US $CO_2$ emissions by 250%. Therefore, if low cost emission control processes were introduced in the U.S. it could pressure Asia to adopt them. Otherwise the U.S. could be pressured to remove coal use to "benefit" the World and lose even more manufacturing as energy intensive industries leave the US.

Summary of this Inventor's $CO_2$ Sequestration U.S. Pat. No. 7,282,189 and U.S. Pat. No. 7,553,463

As is described in more details in the next Section, sequestration of $CO_2$ from coal power plants consists of three steps.

(1) Separation of the $CO_2$ from the combustion products, mainly nitrogen ($N_2$) which accounts for 80% to about 90% of the combustion gas exhaust, and other minor pollutants such as $NO_x$, $SO_2$, trace metals, and organics, such as dioxins and furans. Processing the $CO_2$ to prepare it for transport to a sequestration site follows this Step.

As a sub-set of this step, a credit could be claimed if as part of this step the need for producing a product that emits $CO_2$ is integrated in the power producing process (2) Transport of the $CO_2$ to a sequestration site.

(3) Sequestration of the $CO_2$.

(1a) The capability of the air-cooled combustor to efficiently burn pulverized coal char, or unburned carbon in ash without coal volatile matter augmentation results in a $CO_2$ concentration in the combustion gas exhaust of about 20% by volume that equals 29% by weight. This enables physical separation of $CO_2$ from $N_2$ by gas compression without the chemical processes such as using amines or ammonia, and at a small fraction of the energy consumption of the latter. Also, by eliminating chemical separation, there is no need to remove other gas pollutants such as $NO_x$ and $SO_2$ to almost zero to prevent them from contaminating the amines, which require the extremely costly SCR and FDG (about $500/kW). Also, Zauderer's patents cited herein remove $NO_x$ and $SO_2$ to about the level of SCR and FDG, as well as all other pollutants, including $NO_x$, $SO_2$, trace metals (e.g. arsenic, mercury), dioxins, and furans, upstream of the $CO_2$ separation from the combustion gases.

Also, by producing cementitious slag during the combustion process the credit from avoided $CO_2$ by replacing cement production provides an additional major cost benefit.

Another benefit is that the coal volatile matter is converted to hydrogen and the $CO_2$ released during limestone calcination is sequestered with the $CO_2$ produced during char combustion.

The $CO_2$ is then dissolved in water to form carbonic acid, which is then injected into underground limestone formations to form calcium bi-carbonate solutions.

(2b) For the power plants that process the unburned carbon-fly ash or culm there will be no need for $CO_2$ pipelines as the plants would be placed over limestone geologic formation and the fuel shipped there by rail or trucks or barges. Even for retrofits to existing large coal power plants with the cyclone combustor there may be no need for $CO_2$ transport due to the widespread existence of underground limestone formations throughout the World. This removes the threat of a $CO_2$ release if a break in the very high-pressure $CO_2$ pipes occurs.

(3c) The third step of permanent $CO_2$ sequestration would occur with injections of water with carbonic acid into deep below potable water in limestone geologic formations.

Another feature in these two $CO_2$ U.S. Pat. No. 7,282,189 and U.S. Pat. No. 7,553,463 is to implement these steps incrementally in order to incrementally test these processes and methods at low capital cost. This minimizes the risk of investing huge sums for processes that may fail for technical or economic reasons.

The $CO_2$ patent (U.S. Pat. No. 7,282,189) teaches an incremental solution for $CO_2$ removal beginning with the removal of fly ash mixed with up to 20% unburned carbon from the particle collection system of existing coal power plants that operate fuel rich for $NO_x$ control and burning it in air-cooled, slagging combustors, separating the 20% $CO_2$ from the 80% $N_2$ and compressing it in water to form carbonic acid, and injecting the solution in underground limestone formations that constitute 2% of the Earth's crust where it will dissolve the limestone to form calcium bicarbonate.

The present Application discloses the steps by which the incremental approach to $CO_2$ removal, as described in said patent, would be implemented:

The first step for which the above 20 MW plant is the prototype, is to erect stand-alone power plants whose function would be to convert fly ash with unburned carbon, or culm into cementitious slag while generating electricity, sequestering $CO_2$ and disposing of RDF.

The second step is to use as the plant's fuel, char from raw coal whose volatile matter is converted at the plant into hydrogen. The char (fixed carbon and ash) is burned in the same design, air-cooled slagging combustors. The slag production, $CO_2$ separation and sequestration are identical as in the first step. The hydrogen can be used to fire gas turbines at the plant, or sold for chemical processing, or as a transportation fuel for diesel engine or fuel cell power vehicles.

Since the natural gas lobby has been promoting this natural gas as "clean" compared to "dirty" coal, an alternative, noted in the first U.S. Pat. No. 7,282,189, to hydrogen production is to process the coal volatile matter into methane, which is essentially natural gas. This process is similar to coal gasification with one major difference in that in gasification all the coal including the solid fixed carbon is converted into gas, which requires operation at much higher temperatures, about 1000° F., than de-volatilization of coal, and it is much more expensive in that indirect heat in metal heat exchangers is not possible, and the efficiency is lower, and topping all this is $CO_2$ separation from $N_2$ is very much more costly even if $O_2$ is used.

The third step in the $CO_2$ process is to retrofit the air-cooled slagging combustors on existing coal fired boilers, using combustor designs that derive in part from U.S. Pat. No. 4,624,191 that underwent several decades of development by this Inventor. This last step would then lead to total $CO_2$ removal and sequestration from all existing and new coal power plants. By adding hydrogen production from coal volatiles upstream of coal char combustion in the slagging combustor, the net power output of U.S. coal plants could double while providing zero emissions. This would change the World's energy picture in favor of the U.S. and motivate Asia to follow suit.

The details of implementing the $CO_2$ sequestration are in the first U.S. Pat. No. 7,282,189 and will not be repeated here. The second U.S. Pat. No. 7,553,463 adds another important $CO_2$ sequestration option by preparing limestone emulsions that are mixed with $CO_2$. This facilitates the safe transfer of the emulsion into underground storage or even possibly the Oceans without need for high-pressure $CO_2$ pipelines.

The Ocean solution requires a brief elaboration. On Dec. 2, 2009, Dr. Jane Lubchenco, Administrator, National Oceanic and Atmospheric Administration testified at a U.S. House Hearing by the Select Committee on Energy Independence and Global Warming that $CO_2$ in water is acidic, it is dilute carbonic acid, and as such its injection or deposition into the Oceans will cause it to react with calcium carbonate to form the calcium bi-carbonate. The shells of certain marine life are made of calcium carbonate, which will react with the carbonic acid and dissolve the shells and destroy them. She demonstrated this by placing chalk (calcium carbonate) in pure water, 50%/50% vinegar/water and 100% vinegar. No reaction occurred with the water. Chalk started to dissolve slowly in the 50/50 mixture, while the chalk dissolved rapidly in the 100% vinegar. She selected vinegar to demonstrate rapid solution of limestone. Carbonic acid is much less acidic. It is found in carbonated water. However, by injecting the emulsion in which the reaction of carbonic acid with limestone has already been converted to calcium bicarbonate, the emulsion will not dissolve marine shells in the Ocean. But in any case, the two patents teach that in-ground sequestration is much preferred because the Earth crust contains 2% or more limestone, which far exceeds the far less than of 1% carbon in fuels in the Earth's crust.

The Other Currently Pursued $CO_2$ Sequestration Methods in the USA, Europe and Asia.

To repeat from the previous Section, $CO_2$ sequestration involves three steps:

1) Separating the $CO_2$ from the products of coal, oil, or natural gas combustion.

2) Transporting pure $CO_2$ liquefied at high-pressure to a permanent sequestration site.

3) Permanently sequestering the $CO_2$ by injection into geologic formations.

A careful analysis by this Inventor of the methods in current use or under development revealed very substantial technical and economic deficiencies in all the three steps that are currently being pursuit.

In the following discussion on each of the three steps, the methods patented or disclosed in this Invention will be contrasted with the steps being pursued by others. The best means of contrasting this Invention and related prior patented $CO_2$ technology with other $CO_2$ technology is to compare the performance disclosed for this Invention with another power plant selected by DOE for $CO_2$ sequestration. The other technology selected for comparison is the one that is currently one of the two most favored approaches, namely EOR. This was briefly noted in the Genesis Section of this Application. The project selected for comparison is the enhanced oil recovery (EOR) DOE project at the 870 MW lignite coal fired, Antelope Valley power plant owned by the Basin Electric Co-Op in ND. This plant was the first large scale project selected by DOE in 2009 to demonstrate the separation of 1 million tons annually of $CO_2$, which is 13% of the 7.8 million tons of $CO_2$ emitted by the plant's 2 boilers in 2008. One million tons is the general size of current commercial and demonstration EOR projects. This plant will use an ammonia-$CO_2$ separation process (similar to amines). The plant's 1 million ton high pressure liquid $CO_2$ will be transported through an existing $CO_2$ pipeline that is partially filled now with $CO_2$ from a nearby ND coal-to-gas facility located 325 km south of the Weyburn oil field in Canada. The liquid $CO_2$ will be used for EOR from the oil field by forcing out part of the remaining oil.

As stated in the Genesis Section of this Invention, this inventor could not meet the 50% non-government cost share on a timely basis as required by said DOE $CO_2$ solicitation. However, in order to compare this Invention's $CO_2$ emission control technology with the rest of the field, the Inventor's closely held Company, Coal Tech Corp, submitted a proposal in August 2009 that addressed the four technical requirements in the DOE solicitation. This proprietary, not for public disclosure, proposal contained a detailed preliminary design and cost estimate for a 20 MW coal power plant. As noted in the above Genesis Section, 165,926 tons of $CO_2$ would be removed by sequestering the slag combustion products, 55,219 tons by sequestering the CO, released during hydrogen production with limestone, and 135,590 tons as avoided $CO_2$ by replacing Portland cement production, for a total 396,312 tons of $CO_2$, which was one-third higher than the DOE specified 300,000 tons. Also, only 25% of the heat input was allocated to produce the slag, which left 75% of the heat input for electricity production. This was above the 55% heat input for electricity production specified by DOE. Now the results of this 20 MW prototype have been scaled up to meet the 1 million ton $CO_2$ sequestration project at the Antelope power plant in ND in order to provide a side-by-side performance and cost comparison.

Before commenting on the differences between the DOE-Antelope project and the present invention, the $CO_2$ methods under development by others will be commented on.

1) $CO_2$ Separation a) Amines: Amines are the most common and favored method for separating $CO_2$ from the rest of the combustion gases. It is in current use, both commercially at a modest scale of about 1 million tons annually, and in projects selected by DOE for development. The amines remove the $CO_2$ from combustion gases and are recycled to release the $CO_2$. It is a very energy intensive process and in a conventional coal power plant where the $CO_2$ concentration by volume ranges from 10% to 12%, the amine process accounts for two-thirds to three-quarters of the cost required for the entire sequestration process. Also amine separation requires upstream removal of $NO_x$ and $SO_2$ from the combustion gases to prevent excessive loss of amine effectiveness. The capital cost of SCR and FDG equipment to remove these gases is in the $400 to $500/kW range. This cost cannot be economically justified for coal power plants under 300 MW. According to a MIT Report of March 2009, the CO, removal cost for current sub-critical steam plants is estimated at $74/ton with an efficiency loss of 26%, from 33.6% to 24.7%, including $CO_2$ compression power. Even much larger plants with new super-critical boiler would suffer major cost increases of $52 per ton of $CO_2$ and a 24% efficiency loss from 38.5% to 29.3%.

Ammonia, which is in the same chemical family as amines, has been also proposed for separating $CO_2$ from the combustion gases, with the same performance parameters.

In contrast the prior art patents and the present Invention do not have the costly restriction of amines. The $CO_2$ removal process does not require the extremely low $SO_2$ and $NO_x$ levels that are needed for $CO_2$ reduction processes that use amines. The importance of this distinction became clear from reading the results of the MIT Symposium on $CO_2$ reduction held on Mar. 23, 2009. The apparent industry consensus at the MIT Meeting was that $CO_2$ removal in plants under 300 MW was not economically worthwhile due to the high capital cost of SCR and FGD that is needed to prevent interactions with amines. In contrast this Inventor's cited patented extremely low capital cost $NO_x$ and $SO_2$ reduction processes do not have this SCR and FGD high cost barrier. Therefore, these prior art $NO_x/SO_2$ process would allow $CO_2$ reduction with amines in small power plants without the barrier of high cost SCR and FGD.

EOR Emits 2.5 Times More $CO_2$ after Oil Combustion than Sequestered $CO_2$

The Antelope Valley project will use Enhanced Oil Recovery (EOR) to sequester the $CO_2$. As noted, EOR is not a $CO_2$ reduction process as asserted by DOE and industry. Instead it is an enhanced oil production process because the $CO_2$ generated when the "enhanced oil" is burned above ground in cars, trucks, etc. will release a net of about 2.5 tons of $CO_2$ for every ton of $CO_2$ sequestered. The reason is that oil has 81% of the density of liquid $CO_2$, and 85.5% of oil is carbon, which results in 0.7 tons of carbon out per ton of injected liquid $CO_2$, which when burned yields 44/12=3.67, leaving a net 2.5 tons of $CO_2$ emitted into the atmosphere after deducting one ton of $CO_2$ sequestered and the lower density and carbon content in oil versus liquid $CO_2$. One reason why this point is unclear is that until the void left after previous oil was removed, the $CO_2$ injected will fill this void before driving out new oil. Since there are multiple wells in an oil field, without information of the initial void level one cannot be certain if the EOR oil represents all the injected $CO_2$ or only a fraction. Since EOR removals in all DOE projects are small compared to the total oil volume previously removed, this quantity of $CO_2$ used to fill voids from earlier oil removal and the amount of $CO_2$ used for EOR is not known to someone not having this information. After much searching this Inventor uncovered a report that correlated the amount of $CO_2$ injected and barrels of oil extracted over the life of the project, namely 20 million tons of $CO_2$ injected and 130 million barrels of oil extracted. This results in oil out that equals to 17.6 million tons of carbon, which yields 64.5 million tons of $CO_2$ released into the atmosphere, for a ratio of 3.22, which after subtracting one unit of $CO_2$ sequestered results in a new $CO_2$ emission of 2.22. Using actual properties of oil and $CO_2$ yields a number of 2.5. Until the void from previously removed oil is filled, $CO_2$ will be sequestered over the entire oil field. To determine how much total liquid $CO_2$ can be sequestered before new oil is extracted, i.e. before EOR begins to really be effective, the quantity of U.S. oil extracted since 1900 as supplied by EIA must be used.

Between 1900 and 2005, 191 billion barrels of oil were extracted from U.S. oil wells. This works out to a void for liquid $CO_2$ of 36.9 billion tons, and with about 2 billion tons of $CO_2$ emitted annually from U.S. coal power plants, the extracted oil void would fill up in 18 years. The actual number of years available to the entire continental USA from refilling this void is a small fraction of this because about two-thirds of all U.S. oil is in the Southwest and over one-half of the coal $CO_2$ is emitted East of the Mississippi River. Building $CO_2$ pipelines across the U.S. will not happen. Therefore, EOR should be called a domestic oil production program, not a $CO_2$ sequestration program.

Comment on the Economics of the Large DOE $CO_2$ Capture and Sequestration Projects.
Following the calculations on the net $CO_2$ removed with EOR in the previous sub-section, additional comments on the economics of EOR and saline sequestration are entered here to contrast with the $CO_2$ removal approach presented in this Invention.

The three EOR projects account for 5.7 million tons, or 70%, of the $CO_2$ sequestered in the 5 projects. So for the 5 projects DOE is investing $1.387 billion to remove 8.2 million tons of $CO_2$ annually, which works out to $169 per ton of capital and operating costs. Since at least 50% must be cost shared, the cost is at least $338 per ton of $CO_2$. No information was released as to how this cost compares to the $50 to $74 per ton to capture for $CO_2$ in MIT's March 2009 report and its attendant sharp drop in efficiency, which will require additional coal power plant construction.

In contrast, this inventor's $30 million, 20 MW new power plant Proposal to remove 400,000 tons of $CO_2$ by sequestration and beneficial use credit has first year revenues equal to the entire plant cost. If scaled up linearly from 20 MW to the DOE selected coal power plants, the capital cost would be $75 per ton of $CO_2$ (22% of their $338/ton). However, the revenue from the Inventors Proposal would equal the capital cost in one year of operation.

Sequestration of $CO_2$ in the Sub-Bituminous and Lignite Mining States of the Northern Plains By coincidence most of Montana and Wyoming where the Powder River Sub-Bituminous coal and the Western half of North and South Dakota, where lignite coal are located, also overlay the Madison Formations of limestone that lies beneath this entire region at depths below potable water levels. This has major implications for $CO_2$ sequestration as per U.S. Pat. No. 7,282,189 and U.S. Pat. No. 7,553,463 and the present invention. At present these very low sulfur coals are priced at under $10/ton at the mines, a small fraction of Eastern Bituminous coals. However, transportation by rail to power plants in the Mid-West and East are several times the cost of coal, especially since the region is served by one railroad. However, it is now disclosed herein that coal power plants should be erected at or near the mines and that these plants would include $CO_2$ sequestration in the Madison geologic formations and transmission lines would transfer the electricity outside the region. Also, in view of the abundant mineral resources in this region, this low cost electricity could be used for local metal production. One ton of coal is only valued at under $100 while one ton of non-ferrous metal is valued at several $1000 per ton. This makes the shipping cost of metals minimal. Furthermore, the low cost electricity would allow metal recovery and environmental cleanup, such as at the abandoned flooded Berkeley copper pit in Butte, Mont., to economically recover any copper after the deep water is pumped out and processed.

As with the Eastern anthracite application, the effort would begin with small power plants with a nominal 20 MW capacity to be fired with high ash coals or coal ash, which due to high calcium content in the region's coals facilitates the production of cementitious slag. These small prototype plants would enable developing their operating characteristics. They would be followed by full-scale central station power plants in the 100s to 1000s of MW range. In all cases, the boilers would be powered with air-cooled slagging combustors and include $H_2$ production and $CO_2$ sequestration in the limestone formations beneath the power plants.

Application of the Cited Patents and Present Invention to $CO_2$ Removal at the Antelope Plant As stated above, this inventor's two patents and the present invention for $CO_2$ separation and sequestration with offset credits for cement production is now compared to one of the DOE $CO_2$ EOR process projects selected in the summer of 2009, a $200 million project to remove 1 million tons a year of $CO_2$ from the 871 MW, Antelope Valley, lignite coal fired power plant in ND. The $CO_2$ will be injected into the Weyburn oil field in Canada as enhanced oil recovery (EOR).

The information of just how much $CO_2$ was injected and how much EOR came out as presented in DOE reports is incomplete. What should have been presented is:

(A) How much volume or weight of $CO_2$ was injected over a specific period, namely, day, month, year, and years.

(B) How much of that $CO_2$ was used to fill the void created by prior oil extraction.

(C) After the prior void was filled with $CO_2$, how much oil was extracted per equal volume of $CO_2$.

The latter is the key number of interest because one can use that to calculate how much carbon came out per unit of $CO_2$ injected. Instead DOE reported the data over different time intervals for $CO_2$ in and for oil out. Similarly, the UN "IPCC Special Report on Carbon dioxide Capture and Storage, Chapter 5, Page 204, Box 5.3 cites for the Weyburn oil field an additional 1,000 m³ (10,063 barrels) of oil per day output from the current 1,000 tons of $CO_2$ re-injected. This is a totally uninformative number because no information on total injected $CO_2$ is given. The Pennsylvania Department of Natural Resources also cites a DOE report that in 5 years after the year 2000, 130 million barrels of oil were extracted from Weyburn field with 5 million tons of $CO_2$ sequestered. In this case, no information on re-injection of $CO_2$ is given.

This inventor used the law of conservation of volume, namely a fixed volume of $CO_2$ forces the same volume of oil out. Therefore, if 1,000 m³ of daily oil comes out that equals 35,280 ft³, the density of oil is 56.16 lb/ft³, of which 85.5% is carbon, that results in 847 tons/day of carbon ejected daily in the oil, which on combustion yields 3,106 tons of $CO_2$ daily into the atmosphere. Now Air Liquid Company quotes the density of liquid $CO_2$ at 1.013 gm/cc that equals 63.2 lb/ft³, so 35,280 ft³ equals 1,115 tons of liquid $CO_2$ sequestered, leaving a net emitted to the atmosphere of 1,991 tons of $CO_2$ (i.e. 3, 106-1,115), equal to a ratio of 2.35, or 235% more $CO_2$ out than sequestered in. This is not "sequestration", but it is extremely profitable for oil companies because even at only a price of $20 per barrel oil, one barrel of $CO_2$, which weighs 0.18 tons, and with $20 per ton of $CO_2$ under cap & trade, will only cost $3.55, or 18% of oil, while at the current $70/barrel of oil it would cost only 5%. Even taking the highest MIT (March 2009) cost of $74 per ton to separate $CO_2$ from the coal plant exhaust plus adding a further highest estimate of $36 per ton for transport and sequestration, the total would be $110 per ton of $CO_2$, or $19.8 per barrel of $CO_2$. This would be 28% but still very profitable at $70/barrel of oil. Since "energy independence" is a National objective, EOR will most likely not be curtailed. However, the oil companies should pay for demonstration of $CO_2$ sequestration by EOR, not the taxpayer or consumers of coal-fired power.

The next issue is to determine the economics of EOR versus this inventor's patents and this invention.

Since the $CO_2$ pipeline to the Canadian Weyburn field is operational, there is no need to incur any capital cost for step 2, transport, nor for step 3, sequestration into the oil field. Therefore, almost all the $200 million project must have been allocated to step one, the separation of the $CO_2$ from the boiler exhaust and its compression for transport. Applying the Inventor's solution to the Antelope power plant, would involve scaling up the 20 MW design to 77 MW. The estimated 503,522 tons of ash from the two 871 MW boilers would yield 604,226 tons of cementitious slag valued at $60.4 million from GGBFS slag valued at $100 per ton. The $CO_2$ released during combustion leading to slag formation is 628, 509 tons. The $CO_2$ would be sequestered in the limestone formations in the Madison Groups beneath ND. In addition, 513,592 tons of $CO_2$ from avoided Portland cement production would be credited to the 77 MW plant. In addition, the volatile matter in the local lignite, the fuel for the 77 MW plant, would be converted to hydrogen for use as a fuel for a gas turbine at the plant, or for transportation, or chemical feedstock. The carbon dioxide released in this process would be an additional 270,068 tons to be sequestered. Therefore, the total $CO_2$ to be sequestered is 898,577 tons. Adding the $CO_2$ credit of 513,592 results in a total reduction $CO_2$ reduction of 1,456, 479 tons of $CO_2$, which equals 19% of the total Antelope plant $CO_2$ emissions versus 12.8% in the 1 million ton DOE project.

Extrapolating the $26 million estimated capital cost from the 20 MW to the 77 MW plant would yield a capital cost of $117 million. This is one-half of the Project's DOE and Basin cost.

More than offsetting this 77 MW plant capital cost is the revenue from plant operation. In addition to the annual $60.4 million revenue from cement slag sales cited above, the revenue from the wholesale ND grid would be $18.46 million (@$30/MWH), and $29.1 million from an assumed $20 per ton of $CO_2$. This results in total annual revenue of $108 million for the first full year of 8,000-hour operation. Now this assumes the hydrogen is used for on-site electricity production. However, if it sold as a transportation fuel for $H_2$ powered diesel engines, or for fuel cells (transportation or stationary), and assuming a $H_2$ price equal to gasoline at $2.50/gallon (HHV~0.14 MMBtu/gal.), the 27,662 tons of $H_2$, with a HHV of 3,374,810 MMBtu, would receive $24.1 million versus only $4.6 million for 153,400 MWH based on a 30% plant efficiency and $30/MWH. Of course there would be no $CO_2$ emissions, and the total revenue would be $127.5 million instead of $108 million. In either case, the revenue in one year would be about equal to the capital cost of the 77 MW plant.

Another alternative, if the operators can convince the EPA to ignore the 2.5 times more $CO_2$ from EOR. The Antelope plant could receive the same revenue as with the DOE project, except the profit would be much greater because the plant costs one-half that of the DOE plant.

The above shows the benefits of building a 77 MW plant to process the ash from Antelope's two boilers.

Next the result for retrofitting the air-cooled slagging combustors to the two existing 871 MW boilers is presented.

Retrofitting air-cooled slagging combustors to the 871 MW Antelope Valley boilers and firing them only with the fixed carbon in ND lignite, whose HHV is about one-half of the total HHV, the lignite char would generate the same output of 6.9 million MWH as the current plant minus 14% (0.97 million MWH for removing and sequestering in the limestone Madison formations. The lignite volatile matter would be converted to hydrogen, which would about double the output of the plant by adding about 7 million MWH output. This would double its electricity revenue, which at $30/MWH would add $200 million. Assuming the same $20/ton price for the present 7.783 million tons of $CO_2$ would add another $156 million. Finally, the GGBFS slag sales would be $60 million, for a total added annual revenue stream of $416 million. This would add $60 per MWH, about double whatever revenue the plant earns now, without perpetual government subsidies for "renewable" power. If on the other hand, the hydrogen would be used for metal refining, the revenue would be substantially greater.

This Comparison Shows that the Present Invention is Far More Economical in Reducing $CO_2$ Emissions than Anything Being Supported by Governments at this Time.

The Problems with and a Solution to Extracting Natural Gas from Shale

Introduction: For the past several decades the demise of coal has been regularly predicted, yet the use of each alternative energy source has ended in financial disaster. One reason for this problem was the reliance on lobbying to promote pet projects through Congress instead of using science, engineering and economics. A Report "A National Strategy for Energy" by a Washington based groups, Securing America's Energy Future (Sep. 28, 2008) cites the Congressional Research Service found 12,531 separate (Congressional) earmarks, totaling more than $37 billion in DOE's budget for FY1994, FY1998, FY2000, FY2002, FY2004, FY2005." As a result funds for development of technologies, such as those disclosed in the present Patents and Invention are not available. Therefore, it is necessary to cite the differences between alternate technologies, such as are disclosed herein, to enable those knowledgeable in the field to compare them.

In the 1990s there was a rush to natural gas fired power plants because gas was cheap, about $2/MMBtu, gas fired power plants cost a fraction of coal plants, and could be erected within 1 to 2 years, as opposed to coal power plants that could take years just to obtain approval. Then "cheap gas" came crashing down around 2000 when the added demand for gas for the power plants drove the price of gas to as high as $10/MMBtu thereby forcing the gas turbine power plant owners into fire sales or bankruptcy.

This should have given the coal utilities breathing room to develop low cost solutions to the major problem with coal, namely emission control. This opportunity was wasted because the utilities used legal action and political lobbying to stall implementation of emission regulations. Also, apparently unrecognized by the utilities is that DOE was the most impacted agency by the use of Congressional earmarks, as noted above. As a result, the bulk of DOE's budget went to power equipment companies who focused on the most costly solutions, e.g. SCR, FGD, ACI. This increased their revenue, as it did to the generation industry, which could pass on these costs in their rate base. Therefore, these was little interest in low cost solutions for emission controls as this Inventor experienced when in 1997 he reported at two National DOE Conferences the test results of his very low cost SNCR $NO_x$ process that could duplicate the very costly SCR process. (U.S. Pat. No. 6,048,510, Issued in 2000, and U.S. Pat. No. 6,453,830, Issued in 2002). Repeated proposals to DOE to implement this $NO_x$ process on utility boiler at costs of several hundred thousand dollars were all rejected. This Inventor finally implemented these $NO_x$ tests on a 50 MW boiler with internal resources (U.S. Pat. No. 6,722,295)

One result of these tactics was to leave the field open to "renewable energy" advocates with the result that the US is now overrun with wind (more on that below) and solar projects and only a few coal plants are under construction, with coal's latest barrier being $CO_2$ removal.

Then came the latest "solution" in the past several years, the promise of countless trillions of cubic feet of natural gas from deep tight rock shale formations, two of the potentially largest are the Barnet shale in Texas and the potentially even much bigger Marcellus shale that is located primarily in Western Pennsylvania and stretches up to NY and down to WV. According to a Pennsylvania and a New York geologist, the Marcellus shale may hold 500 trillion cu. ft. of gas, with 50 trillion readily recoverable. After the first few wells were drilled in PA and WV, the recoverable quantity estimates kept rising exponentially to 100s of trillion cu. ft. However, there are some potentially serious issues in recovering this bounty. While the existence of Marcellus shale has been known for decades, this gas is enclosed in tight rock formation, at an average depth of 7,000 feet in PA. This problem has now been solved by horizontal drilling, namely a well is drilled vertically to the middle of a shale depth and then the drill is turned 90° and moves horizontally in a 360° star pattern, clock wise. However, the "show stopper" problem is the huge amounts of water that must be injected to break the rocks in a process that is called "Tracking". More troubling is that "proprietary" possibly hazardous organic chemicals are mixed with this water to achieve appropriate viscosities for fracking. This water must be pumped back to the surface to help drive up the natural gas, methane, a process called "backflow", whose percentage ranges from 20% and up to most of the injected water, depending on the reporting source. This backflow of contaminated water must be cleaned before disposal. At present this process water is exempt under federal regulation, and only governed by uneven State laws. It involves treating the water in special treatment plants followed by further treatment in municipal waste treatment plants and discharge into streams, rivers and lakes. In addition to the need to remove the chemicals injected with the water that the "fracking" water picked up, hazardous trace metals, such as arsenic, mercury, lead, etc. that is picked up in the underground water must also be removed. This metal contamination is probable because rainwater in Pennsylvania and nearby states is acidic with pH in the 4 to 5 range (7 is neutral), which will leach trace metals into streams and rivers. As was discussed above in connection with the recovery of anthracite culm where FIG. 5 showed the current impact of Acid Mine Drainage on over 3000 miles of the Pennsylvania's 54,000 miles of rivers and streams, and further contamination to about one half of the waterways in almost all States have high mercury levels in fish. It would be unwise to risk further contamination from fracking water.

Congress is considering banning fracking, which might make shale gas recovery uneconomical. There is also a concern that this procedure could lead to surface ground subsistence, especially in Texas where the Barnet shale is under population centers. In connection with this, the announced purchase in December 2009 of a major Company drilling in the Marcellus shale by one of the largest international oil companies has a back out clause to be triggered if Congress restricts or bans fracking.

As is the case with EOR, no direct information on how many cubic feet or gallons or pounds of injected "fracking" water are needed to produce so many cubic feet or pounds of methane. Instead the relationship of water used and gas produced are released in a manner that cannot be directly used to determine the water input to break the shale to the water input to push the natural gas out. For example, one source cites a gas output from a Marcellus gas well at 1 million cubic feet (c.f.) per day or 2.5 billion c.f. over the estimated life of the well. Another source cites the injected water at 4 million gallons and 800,000 gallons flow back, which is almost useless information, as it does not relate to a specific amount of methane recovered. Another document entitled "Marcellus" dated August 2009 by the Penn professor, who claimed the 50 trillion c.f. of recoverable gas, also does not correlate water in with gas out. However, the document shows graphs that as gas is withdrawn from the well the quantity of gas removed decreases rapidly by over 80% in one year. Therefore, the relationship of water in to gas out is of major importance.

However, the same simple conservation of mass that this Inventor used for EOR oil recovery calculations also applies to shale gas recovery. Boyle's Law, "pressure×volume=mass×gas constant×gas temperature" is used. Gas pressure increases by 0.465 psi per foot down so at the average 7,000-foot depth of the Marcellus in Pennsylvania, the gas pressure is 3,255 psi. Applying this equation to one reported well of 2.5 billion c.f. gas recovery, one obtains 84,457,478 gallons of injected, chemically contaminated, fracking water. One example yielded 4 million standard c.f. per day, which equals 18,065 c.f. per day at 3,255 psi, and requires at least 135,132 gallons of water per day, or 5,631 gph. The gas released has a HHV of 4000 MMBtu/day, or 167 MMBtu/hr.

Comparing this fracking water on an equivalent energy use basis with coal, one finds 167 MMBtu/hr in a PA coal with a HHV of 11,000 Btu/lb would require 7.58 tons of per hour (about ⅓ truckload), of which the typical 10% ash would be 0.758 tons. Now storing this coal fly ash in ash ponds at utility power plants in a 50%/50% ash/water sludge, would require 0.758 tons of water by assuming equal densities. The results is 182 gallons of contaminated water, which equals to 3.23% of the 5,631 gallons of contaminated water required to frack one hours supply of natural gas.

Another way of analyzing this water issue is to compare it to the $800 million cost to cleanup TVA's Kingston 1 billion gallon ash pond spill, of which on a 50%/50% basis involved 500 million gallons of contaminated water. This would be 5.9 times the 84,457,478 gallons of injected, chemically contaminated, fracking water to recover 2.5 billion c.f. of natural gas. Now contaminated fracking being a liquid disperses very much more than ash-water sludge, especially as it is disposed in streams and rivers. Now the Kingston cleanup works out to $1.6 per gallon of 50% water. On a BTU coal basis, the solid 500 million gallons ash using the same density as water would be 30,000 tons of ash, and 300,000 tons of coal. So the ash spill cleanup cost is $2,666 per ton of coal, equal to about $121/MMBtu, at 22 MMBtu/ton.

Applying this cost proportionally to the above fracked water example of 29.6 c.f. of natural gas per gallon of water, namely, i.e. $(2.5 \times 10^9/84 \times 10^6 = 29.6)$, yields $0.054/c.f. of gas, or $54 per MMBtu. Although this is an estimate it clearly shows the potential for damage from using these massive amounts of water for fracking, even if the contaminated water is treated because there is no way of knowing whether all harmful chemical have been removed. An example is the December 2010 report of a recent study that hexavalent chrome has been found in randomly tested municipal water supplies in PA. Furthermore, the drillers refuse to divulge what chemicals they are using for "proprietary" reasons, which is incredible in view of the history of industrial water contamination over the decades. To top this there are also organic contaminations. Through the ages cholera and typhoid contaminated water supplies occurred at regular intervals. For a product that sells for $4/MMBtu, there is no way that these cleanup costs can be paid if contamination is found.

Also this "clean" gas fuel has a far worse potential for environmental damage than "dirty" coal. The TVA ash spill was a singular even, and the remedy is to convert the fly ash to chemically inert, cement-slag at disclosed in the present invention and prior related patents. On the other hand, no alternatives to using water for fracking have been disclosed. Therefore, the present invention discloses the use of liquid compressed $CO_2$ instead of water to eliminate the water contamination risk, and the risk of entraining hazardous trace metals, such as As, Pb, and Hg, that occur naturally underground to the surface, as the gas rises.

To gage the impact of the water use for the 50 trillion c.f. of supposed recoverable gas from Marcellus requires $2.258 \times 10^{11}$ c.f. of potential contaminated water, which equals 1.32% of the water in Lake Erie. Another recent estimate of 363 trillion c.f. increases the water to 9.6% of Lake Erie. Considering the acidity in Pennsylvania's lakes and streams, it is unwise to add this potential hazard, even if the water is treated before discharge in to water streams.

To repeat, these contaminated water sums are about 100 to 700 greater than the water in utility ash pound that resulted in TVA-Kingston's one billion gallon ash spill. Unlike ash spills, fracking water will be widely dispersed, making cleanup very expensive, if not impossible.

In addition another unanswered question is what other gases are removed from the shale. It is well known that natural gas wells can contain $CO_2$ which is flared or must be re-injected as is the case in a Sahara desert field, or partially sold for EOR as is the case in an Exxon gas field in Wyoming which yields 66% $CO_2$ and 22% natural gas, (methane). This equals 660 million c.f. per day of $CO_2$ (equal to 24,875 tons per day or 1,036 tons per hour) and 200 million c.f. per day of $CH_4$, which contains 223,385 MMBtu/hr of energy. Using this gas in a gas turbine-steam turbine combined cycle with efficiency of 8 MMBtu/MWH would produce 1,163 MW/hour. A conventional coal plant produces 1 ton of $CO_2$ per MW per hour. Therefore, this gas field emits as much $CO_2$ as an equivalent coal plant. Of course as shown above, if the $CO_2$ were used for EOR, the result would be 250% more $CO_2$ than sequestered. All this is in addition to $CO_2$ from the gas fracked from shale.

The present invention discloses a new alternative method that requires no water to push out natural gas from shale deposits, such as in Marcellus. Specifically, liquid $CO_2$ recovered from coal power plants as per U.S. Pat. No. 7,282,189 would be injected to frack the shale. As the methane and $CO_2$ rises from the well, the $CO_2$ would be separated as is done now in gas wells. However, it would then be re-pressurized to a higher level than the Marcellus injection level in order to inject it into limestone formations that are beneath shale formations for permanent sequestration. This solves both the $CO_2$ problem and eliminates the contaminated fracking water problem.

However, it must be reemphasized that even if the Marcellus shale has an infinite amount of recoverable methane gas, and even if the present disclosure of liquid carbon dioxide for fracking and then re-injecting it into limestone formations for sequestration and thereby eliminate the need for water, in the end the combustion of $CH_4$ will only reduce $CO_2$ emissions by about one-half below coal, which is still 2½ to 5 times more than the target reduction of 80% to 90% being contemplated for mid-Century. Also, the $CO_2$ concentration in the gas turbine exhausts would be only about 3%, thereby making separation of the $CO_2$ from the exhaust gases with amines or ammonia very energy intensive and costly. Consequently, removal and sequestration of $CO_2$ from coal by the processes disclosed in said patent and this application is the preferred choice and it could be implemented in a matter of years instead of many decades.

Cement-Slag Production as an Alternate Means to Mountaintop Mining

Mountaintop mining involves removing the overburden on the top of a hill to depths of typically about 400 feet to reach coal seams. In addition to removing trees and vegetation on top, the overburden including water is discharged into surrounding valleys thereby blocking streams in the valleys. EPA researchers have found that the solid and liquid runoff acidifies downstream groundwater and waterways and deposits hazardous trace metals and organic matter that destroy invertebrates.

It is now herein disclosed that much if not all this damage could be avoided by utilizing the same process and method disclosed in the U.S. Pat. No. 7,247,285 and in this Invention. The reason being that much, if not most, of the removed overburden mixed with sufficient coal of at least 25% by weight could be processed the same way as anthracite culm, and converted to marketable cementatious slag in the air-cooled slagging combustors. To prevent discharge of overburden into valleys, multiple vertical pits of small cross-section would be dug down to the coal seams and the 25% coal would be mixed with overburden and fired in slagging combustor to make cementitious slag. Drilling machines would then be lowered to the coal seam to dig out the coal radially, in a manner similar to gas extraction from gas shale. This method not only removes the risk of downstream contamination and attendant future litigation, but it also eliminates the disfiguration of the hills of the Appalachian, and also provides substantial additional revenue from cementatious slag sales.

Rehabilitation of the Berkeley Pit, Butte, Mont. with Revenue from Slag Sales

The Berkeley pit is well over one-half filled with acidic water since open pit copper mining ceased over a decade ago and the drainage pumps were turned off. By placing one or more sub-bituminous coal fired boilers connected to air-cooled slagging combustors within economic distance (range of 100 miles) of the Butte pit in Butte, Mont., the minimal cost of electricity when combined with cement slag production and $CO_2$ sequestration in the Madison limestone formation and selling the $CO_2$ credits, then recovering the copper in the pit may be economical, and as a result the water in the pit could be rehabilitated and it may even generate enough revenue to fill the pit with overburden. This is only speculative and it is disclosed herein to suggest that environmental compliance need not render mining unprofitable, if co-benefits are incorporated.

Misrepresentations about "Renewable" Wind Power in the U.S.A.:

Wind power is a powerful example of how selective disclosure, public relations, lobbying, environmental advocates, and Congressional earmarking has resulted in massive over-allocation of U.S. federal, state, and electricity user resources to wind power. Wind power will not achieve the proposed National goal of 80+% $CO_2$ sequestration by mid-$21^{st}$ Century. Even worse, it may hinder the goal of $CO_2$ reduction and contribute to further reduction of energy intensive U.S. manufacturing due to the inherent intermitted nature of wind power.

While everyone recognizes the wind blows from about 25% to at best 50% of the year, there appears to be scant awareness of the serious adverse consequences of the State and Federal governments forcing "renewable" wind power onto the U.S. economy. This knowledge is obfuscated by catch slogans such as "green", "clean", "renewable", and especially the word "free", which neither wind or also solar are not.

The present discussion will show that total year round near zero emissions from coal power is much "more renewable" than wind and solar. Furthermore, year round, low cost electricity from coal power for electric vehicles will be much less costly than wind and solar and even biomass derived electricity. Finally, and most important, low cost coal power would revitalize US manufacturing.

These contradictions and misrepresentations are not widely known because the information is scattered and contradicted throughout wind power reports, especially those issued by wind proponents. An example is the one issued by DOE in a Report "20% Wind Energy by 2030" in July 2008 by DOE's National Renewable Energy Laboratory (NREL), which is charged with implementing the wind program. 20% Wind has now been accepted as "fact" by wind promoters, natural gas promoters, and environmentalists and it is given as the reason why coal plants must be shut down because wind will provide "energy independence" by enabling the transfer of cars from gasoline to natural gas and wind and solar generated electricity.

The following lists misrepresentations and contradictions in "Wind Power" reports.

a) The financial data on the capital and operating costs of wind are substantially underreported because they do not include the large federal and state tax credits. In 2005 Congress enacted a "Renewable" Energy Law, which presumably is still in effect, that gives a $19/MWH generation tax credit, plus a generally unreported depreciation tax credit. In 2007 DOE/EIA reported wind generation at 34.45 million MWH, yielding a $655 million tax credit. In 2008, it was $988 million, and in 2009 it will be about $1,089 billion. Since, according to EIA, the price from the PJM grid in 2009 through mid December it was about $45/MWH, the credit is an incredible 45% of this, which explains why wind developers and utilities advertise in the media their "support" for wind. However, unreported is that much of this money went to wind companies in Spain, Denmark, Germany, India and especially China where the bulk of wind turbine expertise and manufacturing is located. Even more incredible when a report from scientists and engineers in a Madrid University reported that wind is not economical and led to job losses in Spain, which is partially validated by the Spanish governments cut in wind and solar subsidies, the DOE/NERL issued a rebuttal report that skirted the primary charges in said report. All this is occurring at a time when the federal and State governments are seeking measures to restore job loss in the 2008-9 recession.

b) The DOE-EIA reports the annual wind capacity (MW) and output (MWH). Dividing annual output in MWH by capacity in MW provides the annual hours at rated output. In 2007 capacity was 16,515 MW and output was 34.45 million MWH, yielding only 1,904 hrs or 21.7% of 8,760 hrs per year. In contrast in 2007 coal power was 2.017 billion MWH at 314,000 MW capacity for 6,241 hours, or 73.3%. So the annual coal power was available 3.4× longer per year than wind. This means that with recent prices for several 100 MW wind projects with nominal 1.5 MW turbines reported at about $1,550 per kW, their actual cost is 3.4 times that based on hours per full year operation, namely $5,270 per available kW. The March 2009 MIT report cited an estimate of $3,000/kW for a new supercritical coal power plant with amines for total $CO_2$ removal, without subsidies. In 2007 nuclear power plants were on line for 7,984 hrs or 91% of the year, which is 4.19 times that of wind and which make wind's actual equivalent annual capital cost equal to $6,485 per kW. This about equals the cost of a new nuclear power plant, which emits zero $CO_2$.

c) There are other unrecognized factors by which wind power adversely impacts electricity users, namely, the PJM (and also certainly the other grid operators), give preference to "clean" and "renewable" electricity. Examination of the EPA data on coal power plant emissions shows that large central station coal power plants operate at 80% C.F., while the reported value as noted above was 73.3% in 2007 The reason for coal underutilizations, as incredibly noted in the "20% Wind" DOE report, is that the grid operators put the so-called "free" electricity from wind ahead of the line. This is another factor in driving energy intensive manufacturing to Asia, where emission controls are lax, and where environmental groups do not have the power to halt construction of higher emission coal plants. As a result, Asia's emissions of coal ash particulates, mercury, and $CO_2$ into the atmosphere drift toward North America. In this decade, U.S. atmospheric scientists under NSF support have measured ash and trace metals in the atmosphere above the Pacific Ocean basin. The ash forms a continental size cloud over the Ocean. China's mercury emissions (about 1,000 tons annually) deposit on U.S. soil in amounts that exceed the nominal 40 tons of mercury emissions of all U.S. coal power plants. Also as noted above, China's increased $CO_2$ from coal in this decade exceed U.S. coal plant annual emissions.

d) Another major misrepresentation concerns coal versus wind Capacity Factors (C.F.), reported by DOE/EIA as Levelized Capital cost and Total Levelized Operating cost in $ per MWH. There are quite a number of such studies, some of which are cited in other sections of this Invention. However, here the objective is to differentiate this inventor's approach from that of others, and in this Section, the flaws of renewable wind. ETA's Annual Energy Outlook, (April 2009 SR-OIAF/2009-03) contains tables of the estimated Levelized costs of various new generation sources. Table No. 1 for the year 2016, as an example, lists the followings

TABLE 1

Power Plant Costs for Year 2016- (Source- #1 to # 6-EIA, #7. This Invention)

| Plant Type | Capacity Factor | Levelized Capital- $/MWH | Levelized Total-$/MWH |
|---|---|---|---|
| 1. Conventional Coal | 85% | 64.5 | 94.6 |
| 2. Advanced Coal & $CO_2$ In | 85% | 75.6 | 103.5 |
| 3. Advanced Coal- $CO_2$ Out | 85% | 87.4 | 122.6 |
| 4. Wind -Land based | 35.1% | 122.7 | 141.5 |
| 5. Wind- Offshore | 33.4% | 193.6 | 229.6 |
| 6. Solar Thermal | 31.2% | 232.1 | 263.7 |
| 7. Combustor retrofit & $CO_2$ Out-U.S. Pat. # 7,282,189 | 85% | 30 - Slagging combustor on existing boiler retrofits | 60 |

Notes:
(1) EIA uses 35.1% C.F. for all U.S. wind in 2016, while NERL has 36% only for Region 3 -Fair. Region-4 is 41%, Region 5 is 44%, Region 6 is 47% and the rare Region 7 is 51%. In 2030, presumably by counting on improvements, NERL's numbers are 38%, 43%, 44%, 49%, and 53%. (See FIG. 7 herein, and Wind Regions explained below) NERL uses 44% for all U.S. land wind.
(2) The last row in this Table is this Inventor's estimate of using $CO_2$ removal and sequestration technology in said Patent which involves retrofitting air-cooled slagging coal combustors to existing boilers, erecting hydrogen production from coal volatile matters, and equipment for $CO_2$ removal and sequestration. The cost is estimated to be one-half of the capital cost a new conventional coal plant while retaining the same O&M and transmission costs.

e) The adverse impact of renewable intermittent electricity on U.S. manufacturing and related jobs can be deduced from the total and industrial electricity sales over the past two decades, as U.S. manufacturing moved to Asia, especially China. The example in FIG. 8 is for Pennsylvania, and a similar or worse pattern exists in other States with a high manufacturing base, especially in the Eastern half of the U.S. While total electricity increased in the past two decades as new uses arose, manufacturing remained constant. This electricity use for manufacturing correlates with the labor in this sector as shown in FIG. 10 for Pennsylvania (U.S. Bureau of Labor Statistics) where after 2000 there was a sharp drop in manufacturing jobs and electricity use stagnated (FIG. 8). Electricity did not drop as much as labor because manufacturing that is energy intensive uses less labor.

f) The following calculation compares this inventor's 20 MW carbon-fly ash to slag-zero emission prototype plant with a wind power installation, both in the PJM grid:

According to DOE/NREL's map of Wind Resource Potential (FIG. 7—discussed in the next sub-section "g") the U.S. South-East quadrant has poor potential and most of North East quadrant is marginal. This is where almost all coal power plants that service over one-half of the U.S. population are located. This results in higher wind costs, and in 2009 EIA priced PA wind, which is in the MAAC Region, at $147/MWH levelized, of which capital cost is $127/MWH. So to replace the 396,312 tons of $CO_2$ that would be removed in the inventor's 20 MW plant with wind power would cost $50,331,624, using typical 1 ton/MW of $CO_2$ emission in coal plants. PA is part of the PJM grid and the average price in 2009 through December was $45/MWH, would cost $20,807,850. Therefore, the cost difference for $CO_2$ between the inventor's plant and the wind plant is $29,523,774, and dividing by the 396,312 tons removed results in $75 per ton of $CO_2$ higher cost for wind. But, wind operates 25% of the time, while coal plants can operate in the 80% range. Therefore, the real use of wind power to remove this $CO_2$ would cost about $238/ton. Even the March 2009 MIT Report had only $66 per ton of $CO_2$ for sequestration. Now Coal Tech's proposed 20 MW combined cycle plant has an estimated capital cost of $26 million. Using a DOE annual capacity factor of 16% would yield an annual capital cost of $4,160,000 ($26 million×0.16) and divided by the 396,312 tons of $CO_2$ removed would yield a cost of $10.49 per ton of $CO_2$ removed. With combustor retrofit to coal fired boilers, the capital cost would be even lower. The fuel cost is minimal when using unburned carbon in fly ash as proposed, and the fuel cost is also low when using coal and extracting hydrogen from the volatile matter. Also, unique to this application of the technology is that a substantial revenues stream is obtained from the sale of cementitious slag while also receiving avoided $CO_2$ credits. This of course lowers the $CO_2$ removal and sequestration cost to the point where the cost becomes a substantial profit. This is a clear-cut advantage of the 20 MW plant over equal rated wind power.

g) How DOE/NREL arrived at the 20% Wind by 2030.

g.1) The USA Wind Map: The first step is to examine a color wind map of the USA, prepared by DOE/NERL and shown in FIG. 7 herein, in black and white, which masks the difference between the various wind regions, It was copied from a DOE/NREL color chart, but is still shows the lack of extensive locations for wind power in the U.S. However, this deficiency is also apparent in black and white. The map is divided into 7-color zones. The Southeastern quadrant of the U.S. is rated No. 1-poor, and the Northeast, with some small exceptions, is rated 2-Marginal, the far West also has large white No. 1 areas. Therefore, much of the U.S. is not suitable for wind. The most promising region is the Central Plains above Texas to Canada, which however is the most sparsely populated region, and therefore will require long and costly transmission lines. This explains the heavy lobbying by wind advocates for erection of long distance transmission lines. With the exception of several small regions in the North, the only places where Excellent-5, Outstanding-6 and Superb-7 wind areas exist are offshore along the Atlantic, Caribbean, and Pacific coasts. This is not a promising picture, and the fact that the Congress and many States are promoting wind cannot be explained on technical grounds.

g.2) The NREL 20% Wind Report has two tables. Table B-10 is for land-based wind and Table B-11 for offshore wind. Both show the capital cost and capacity factors (C.F.) for wind regions 3 through 7. In addition, assumptions are made that the capacity factors for each region would increase and the cost decrease in 5 years increments. While there may be some justification for reduced cost, but why would the wind capacity factor increase over the years, unless the blade length grows massively, which would increase costs even if only for the foundations. The C.F. in Region 3 is in the 35% range, while Region 7 it is in the low 50s % range. To repeat, an apparently repeatedly understated fact is that another power source is needed for the rest of the year. Since "renewable" advocates have consigned coal to shutdown, and they also oppose nuclear power, that leaves natural gas. However, as discussed above, even assuming the water fracking use and pollution problems can be solved, such as replacing it with liquid $CO_2$ as disclosed herein, and using NERL's very optimistic 44% C.F, for wind, it would still result in 0.28 tons of $CO_2$ (i.e. 0.44+0.56×0.5) by combining wind and gas to yield one MW power. If instead the Capacity Factor (C.F.) for wind is the actual output reported for wind by EIA over the past decade, which was 0.25 per annum, the $CO_2$ output would be 0.38 tons per combined wind and gas MW. This of course assumes that the $CO_2$ that is released by gas drilling is sequestered, as is the case in the example of the Wyoming gas field. So the "renewable" wind (and of course solar power) will produce substantially more $CO_2$ than the sequestered $CO_2$ by practicing U.S. Pat. No. 7,282,189, U.S. Pat. No. 7,553,463 and the present Invention with coal. Even with natural gas obtained by use of $CO_2$ from fracking as explained herein will produce less $CO_2$ but more than with coal because the $CO_2$ in gas turbine exhausts is as low as 3% by volume and difficult to separate.

Thus in summary, even accepting NERL's many questionable assumptions, the "20% $CO_2$" Report Summary assertion that by 2030 wind will produce 20% wind power from a 300,000 MW installed wind capacity base with output of 1.16 billion MWH, which equals 3,866 hours, equal to a C.F. of 44%, a figure that is only available in U.S. Land Region 5 and higher, and in offshore Regions 4 and higher, will still produce much more $CO_2$ and at far higher cost than total removal of $CO_2$ by this inventor's patents and current invention.

This Inventor has no objection to wind power. However, government dictates on wind power and government funds dedicated to forcing its use on America is counterproductive and the primary beneficiaries are utilities, foreign wind manufacturers, and States that collect sales taxes on high priced wind. At present the Chinese have become the primary wind suppliers. The Spanish ones, which were in the lead, are now in dire straights because the government has cut the subsidies. Also, a major international Spanish stainless steel manufacturer has moved production out of the Spain due to the high cost and intermittent nature of "renewable" wind and solar power.

The point of this entire argument is that the total amount of $CO_2$ emitted per unit of energy is the final arbiter on solving climate change, not a series of so-called "renewable" processes and technologies that cost too much and do not result in zero emissions, and this applies also to the extremely high cost of nuclear, especially when the unknown cost of nuclear waste disposal is included. This planet has huge coal reserves that lend themselves to zero emissions if approached without pre-conceived solutions, such as "job-creation" projects or "earmarks" for special interests, or vehicles for promoters to cash in on stock IPO's. On the other hand, low cost coal power as disclosed in this Inventor's ten patents and this Invention would reverse the decline in U.S. manufacturing jobs and have a much more positive impact on the U.S. economy than lending money for real estate that borrowers cannot repay due to lack of jobs.

The Adverse Effect of Incorrect and Incomplete Disclosure on Energy Policy

A major problem in seeking a solution to reducing carbon dioxide emissions is that all solutions are presented by advocates as "the only solution" with no consideration of alternatives, which applies especially but not exclusively to "renewable energy. It is to the detriment of one very abundant resource, coal. As was shown in connection with wind even if wind could produce the 44% capacity factor assumed by DOE/NERL for its "20% Wind" model, there is still the matter of the other power sources to reach combined 80% capacity factor, most of which also have serious deficiencies, primarily cost, and other problems. Nuclear has extremely high capital cost and radioactive waste disposal and nuclear proliferation issues. Natural gas in the U.S., in addition to cost, especially if it were mostly used for power, has the water fracking problem, the high cost of separation of 3% $CO_2$ in the combustion gas exhaust for sequestration, which is necessary as its $CO_2$ emissions are 50% of coal, and $CO_2$ and methane emissions from drilling. Oil for electricity is out of the question in the U.S. That leaves coal, which has been written off, and incredibly DOE is pouring most of its $CO_2$ budget on EOR, which sharply increases $CO_2$ emissions. DOE's second choice, saline formations can float to the saline surface and also contaminate if hazardous trace metals are not first removed. One would think that with all these issues and rivers of funds committed by DOE, they would find a few dollars to fund low cost $CO_2$ processes, especially since they would add decades of life to the smaller, under 300 MW coal power plants. One possible explanation is that large equipment companies have committed major sums to develop the amine and ammonia processes in anticipation of multi billion revenues from $CO_2$ sequestration and from super-critical steam power plants, in continuation of already sold tens of billions from SCR and FGD. Overlooked in all this is that manufacturing has and continues to move to China and Asia, while the U.S. lost jobs, as shown in FIG. 10 for Pennsylvania.

Adding to this problem is the misinformation and outright errors being submitted even by advocates of coal power. The following cites only one example from many. It is cited here to support a claim proper reporting should be based on the total energy system, not segments that address only part, such as renewable energy.

FIG. 9 shows a map of the U.S. that was presented at a hearing at U.S. Senate Environment and Public Works Committee in October 2009 concerning climate change by a representative of the coal industry. Although FIG. 9 was in color, the dollars cost can be read in black and white. It lists the cost for each State to comply with $CO_2$ emissions by purchasing allowances in 2012 in order to meet the House passed climate Bill H.R. 2454, June 2009.

According to this figure, with the exception of the "green" Pacific Coast States, Iowa (the "wind capital"), "green" NY, NJ, and New England, the other states would take a major financial hit, with Texas and Pennsylvania the worst off. The problem is that these figures make no sense.

As stated below, the method and processes of $CO_2$ reduction disclosed in this Invention would flip Pennsylvania and other coal States from modest losers into huge winners. The PA hit in FIG. 9 is −$706.8 million, based on a 2012 price of $16 per ton of $CO_2$ estimated by the Congressional Budget Office for 1012. Dividing the dollar total by dollars per single ton yields a $CO_2$ allowance that must be purchased for PA of 44 million tons. Now according to EIA, PA's electric power plants emitted 117 million metric tons (MMT) of $CO_2$ from coal in 2007, and 127 MMT from all fossil fuels. That purchase equals 35% of PA's emissions, while the most Congress is looking to reduce in 2020 is between 17% and 20%. If one includes all emitters, which consists of mostly transportation, PA emitted 295 MMT, which would be 15%, and is possibly what FIG. 9 wishes to convey? However, why is the burden on electricity? However, even if all that would be charged to electric users, the electric utilities wholesale revenue was $9.3 billion in 2007, and the retail revenue was about $19 billion. Therefore, the $CO_2$ cost of $706.8 million is only 3.7% of retail. On the other hand, "green" California charges a 15 cents/kWh average while PA charges 9 cents/kWh, so at the CA rate, PA retail electricity users would pay an additional $13 billion, which far greater than the $CO_2$ charge of $0.7 billion.

The present $CO_2$ process was applied to the Antelope project with 8,000 hours per year operation, 1.45 million tons of $CO_2$ sequestered, and cement credits, resulted in $108 million revenue in the first year. Now scaled up to 44 million tons of $CO_2$ would yield $3.3 billion in annual revenue. This is a very small fraction of the potential revenue from using this invention to convert anthracite culm to cementitious slag with $CO_2$ sequestration.

Therefore, FIG. 9 is another example of how selective information can mislead even if the data is correct because the chart omitted the local cost of electricity. However, the chart in FIG. 9 has an important use in that it shows how "green" States can have financial problems due to high electricity costs.

Also, the purpose of the above discussion is to cite by example how incomplete or selective and partial presentation of scientific, engineering, and economic data has led to enactment of laws, policies and commitment of federal funds that achieve diametrically opposite results without addressing the problem, which in this case is to reduce emissions in an economically affordable manner. One result has been that manufacturing, the one U.S. sector that could create direct and indirect jobs, has been eviscerated and moved to Asia where far greater emissions of particulates, mercury, and $CO_2$ circle the globe.

While the invention has been described in terms of certain exemplary embodiments, those skilled in the art will recognize that the invention can be practiced with modifications within the spirit and scope of the appended claims.

I claim:

1. A method by which a cost of sequestering carbon dioxide ($CO_2$) is totally offset and turned into profits during coal powered electricity generation from revenue and co-benefits by using an air-cooled, slagging combustor that is fired fly ash-carbon mixtures, or de-volatilized coal char, or anthracite coal culm and is co-fired in an air-cooled, slagging combustor with limestone or slag fluxing materials to convert ash into cementitious slag with properties of ground granulated blast furnace slag while achieving combustion efficiencies in about a 90% range.

2. The method in accordance with claim 1, wherein the cementitious slag partly or totally replaces Portland cement production, and avoided carbon dioxide emission from Portland cement kilns is credited to the air-cooled, slagging combustor operation.

3. The method wherein the cementitious slag produced in accordance with claim 1 is processed in stand-alone power plants comprising air-cooled slagging combustor-boilers placed adjacent to central station coal power plants in order to process all the ash generated by the power plant.

4. The method in accordance with claim 1, wherein carbon dioxide in combustion gas exhaust is dissolved in water to form carbonic acid, which is compressed and injected into underground limestone formations below potable water depths for permanent sequestration as calcium bicarbonate.

5. The method in accordance with claim 4 that is implemented in power plants comprising air-cooled slagging combustor-boilers that are placed near underground limestone formations to eliminate a need to transport gaseous or liquid carbon dioxide to limestone sequestration sites.

6. The method, wherein the cementitious slag produced in accordance with claim 1 is implemented in slagging combustor-boiler power plants that are erected on Ocean islands, and carbon dioxide from the combustion gases is converted into calcium bi-carbonate emulsions for injection into the Ocean and the cementitious slag is used for seawall construction off the island's shore.

7. The method for producing hydraulic cementitious slag from anthracite culm or coal mine waste in accordance with claim 1 for constructing sea walls to protect shorelines from rising seas, storms, and contamination from oil spills in Oceans.

8. The method in accordance with claim 1, wherein anthracite culm or coal mine waste located on or beneath a surface or in active or abandoned mine sites is used in air-cooled slagging combustor power plants erected at the mine or at locations having underground limestone or underground saline formations for carbon dioxide sequestration, and including co-production of the cementitious slag and electricity.

9. The method in accordance with claim 1 wherein emissions of $NO_x$, $SO_2$, hazardous trace metals in coal or coal ash, dioxins and furans, are controlled in the air-cooled slagging combustor and in post-combustion zones upstream of where amines or ammonia are injected to separate carbon dioxide from the exhaust gases, or where physical separation of $CO_2$ from the combustion gas exhaust takes place.

10. The method whereby mountaintop mining is implemented by digging vertical pits from a mountain top to coal seams, and combining a mineral part of overburden including at least one of silicon oxide, aluminum oxide, iron oxide, magnesium oxide, with at least 25% of the extracted coal for combustion in air cooled slagging combustor boilers in order to convert the mixture into cementitious slag in accordance with claim 1.

11. The method in accordance with claim 10, wherein disfiguring mountaintop mining and discharging mined solid or liquid waste down the mountain is eliminated by drilling vertical pits of diameter sufficient to lower remote controlled mining machinery to extract the coal horizontally from the coal seams in a manner similar to radial horizontal underground oil or gas extraction.

12. The method wherein new power plants or existing coal power plants retrofitted to perform the process in accordance with claim 1, utilize a revenue stream generated from co-benefits due to sale of the cementitious slag, the sale of avoided $CO_2$ emissions rights arising from replacing Portland cement production, and from electricity sales, and the sale of carbon dioxide sequestration credits offset the power plant's capital and operating costs.

13. The method for operating fossil fuel fired power plants in accordance with claim 12 with near total emission controls and near total carbon dioxide sequestration and co-benefits, with annual electric power capacity factors of 70% or higher, and sell electricity without any government subsidies at prices below government subsidized renewable electricity including at least one of wind and solar power that must be combined with carbon dioxide emitting fossil fuel fired power plants or nuclear power plants to achieve 70% of more annual capacity factor.

14. The method wherein refuse derived fuel from municipal waste or its char or shredded waste paper is co-fired at mass flow rates of 20% or less with coal char, or coal culm or carbon content fly ash in an air-cooled slagging combustor under conditions in accordance with claim 1 for near total emission control and $CO_2$ sequestration, and nearly cutting in half a heat rate achievable in mass burn municipal incinerators.

15. The method wherein refuse derived fuel is gasified indirectly in shell and tube heat exchangers for conversion to hydrogen or methane with remaining char co-fired in the air-cooled slagging combustor in accordance with claim 1.

16. The method wherein hydrogen or methane produced in accordance with claim 15 is used as a primary or major auxiliary fuel in municipal mass burning incinerators in place of bulk waste combustion in order to almost double an incinerator's capacity factor.

17. The method of operating coal power plants in accordance with claim 1 and producing sufficient revenue to offset costs associated with achieving near zero emissions to air, land and water from coal fired combustion.

18. The method to extend an operating life of existing coal fired power plants by operating the existing coal fired power plants in accordance with claim 1 after retrofitting the existing coal fired power plants with the air-cooled, slagging cyclone combustors and its associated emission controls.

19. The method of increasing domestic manufacturing and associated jobs by retrofitting existing or new coal fired boilers with the air-cooled slagging combustors and operating the air-cooled slagging combustors in accordance with claim 1 at near 100% capacity factors in order to reduce electricity costs below all government subsidized power.

20. The method for reducing operating cost of electric furnaces for metals production by using coal fired electric power in accordance with claim 1 and co-producing the cementitious slag, and sequestering carbon dioxide, and installing metals or metal ore manufacturing facilities at or near metal ore or coalmines or carbon dioxide sequestration locations.

21. The method for reducing the municipal waste disposal costs and increasing waste furnace thermal efficiency and reducing environmental impact of the waste by physically separating non-combustible waste and shipping it to a landfill or using it, and converting all combustible matter to refuse derived fuel and co-firing it with about 80% coal or coal waste in an air-cooled slagging combustor in accordance with claim 1.

22. The method wherein disposal of organic content in municipal waste in accordance with claim 21 has a minimal increase on carbon dioxide equivalent emissions compared to landfill disposal because methane emitted from the landfill has about a two dozen times more carbon dioxide equivalent emissions than an equal weight of carbon dioxide.

23. The process wherein hydrogen produced from coal volatile matter is used for reduction of metal oxides to metals, including iron and aluminum and all other metals suitable for hydrogen reduction, at least at one of coal mine sites and above suitable carbon dioxide sequestration geologic formations, including those sites with geological limestone and where the devolatilized coal solids, if any are used as in claim 1.

24. The method wherein hydrogen produced from coal volatile matter in accordance with claim 23 is injected in a post-combustion zone of coal char, or culm, or carbon-fly ash, or solid waste fuel boiler to reduce at least nitrogen oxides and sulfur dioxide.

25. The method wherein coal power plants comprising air-cooled slagging combustor attached to boilers in accordance with claim 1 are erected at or near sub-bituminous or lignite coalmines in Montana, Wyoming, North and South Dakota, have their carbon dioxide exhaust dissolved in water to form carbonic acid and injected into Madison limestone formations that underlie said States, and have their electricity output transmitted to industrial and/or population centers.

26. The method in accordance with claim 25 is implemented in areas that have similar coal and limestone formations.

27. The method where the revenue obtained from power plants erected in accordance with claim 25 near Butte, Mont. to rehabilitate a copper mine pit therein, or abandoned mines by removing and cleaning its accumulated water, recovering any residual copper or other ore, and filling the pit with fresh earth.

28. The method wherein carbon dioxide produced during fossil fuel combustion in accordance with claim 1 is chemically bound to processed serpentinite for carbon dioxide sequestration primarily in regions that are in close proximity to serpentinite geologic formations and can be mined more economically in comparison to other sequestration processes.

29. The method wherein carbon dioxide is liquefied to pressures of about 3500 psi for fracking in underground shale formations to release natural gas trapped in the shale formations, and following surface recovery of the carbon dioxide and natural gas and separation from each other, the carbon dioxide is re-pressurized above 3500 psi, mixed with water to form carbonic acid and re-injected into limestone formations at greater depth than the shale formation for sequestration as calcium bi-carbonate in accordance with claim 4.

30. The method wherein acidified rivers, streams, lakes and water wells that were a result of previous mining of coal or gas or oil, are neutralized with the excess limestone that remains after being used for fluxing coal ash in slagging combustors, removing $SO_2$, removing coal ash trace metals, removing chemicals from combustion products, and preparing emulsions for $CO_2$ sequestration in accordance with claim 4.

31. The method wherein $CO_2$ that is generating in accordance with the steps of claim 1 is injected for sequestration into depleted oil or gas wells continues until a total volume of liquid $CO_2$ injected fills a void left after oil or gas was previously removed from the wells, and following complete filling of the void, any oil or gas that is subsequently extracted due to the injection of additional liquid carbon dioxide for use in combustion systems, wherein resultant emissions of carbon dioxide will be charged to an owner, seller, or user of the combusted oil or gas.

32. The method in accordance with claim 1 wherein combustion occurs at stoichiometric ratios in excess of unity and close to unity to consume all the carbon in the fuel to $CO_2$ to achieve white slag.

33. The method in accordance with claim 9 wherein $NO_x$ is removed downstream of the slagging combustor exhaust using Selective Catalytic Reduction (SCR) or Selective Non-Catalytic Reduction (SNCR) with, or without reburn with a fossil fuel.

34. The method in accordance with claim 33 wherein the fossil fuel is gas from coal volatile matter or natural gas.

* * * * *